US012100319B2

(12) United States Patent
Lee

(10) Patent No.: US 12,100,319 B2
(45) Date of Patent: Sep. 24, 2024

(54) ROTATING DISPLAY APPARATUS USING SEMICONDUCTOR LIGHT-EMITTING DEVICE

(71) Applicant: LG ELECTRONICS INC., Seoul (KR)

(72) Inventor: Sungwhan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 17/753,874

(22) PCT Filed: Sep. 30, 2019

(86) PCT No.: PCT/KR2019/012711
§ 371 (c)(1),
(2) Date: Mar. 16, 2022

(87) PCT Pub. No.: WO2021/054506
PCT Pub. Date: Mar. 25, 2021

(65) Prior Publication Data

US 2022/0406229 A1 Dec. 22, 2022

(30) Foreign Application Priority Data

Sep. 17, 2019 (KR) ........................ 10-2019-0114132

(51) Int. Cl.
*G09F 11/04* (2006.01)
*G09F 13/22* (2006.01)
*G09F 19/12* (2006.01)

(52) U.S. Cl.
CPC .............. *G09F 11/04* (2013.01); *G09F 13/22* (2013.01); *G09F 19/12* (2013.01); *G09F 2013/222* (2013.01)

(58) Field of Classification Search
CPC .......... G09F 11/04; G09F 13/22; G09F 19/12; G09F 2013/222
See application file for complete search history.

(56) References Cited

U.S. PATENT DOCUMENTS 6,265,984 B1 * 7/2001 Molinaroli ............ G09F 19/125 340/815.45
9,741,272 B1 * 8/2017 Chen ....................... F03D 17/00
(Continued)

FOREIGN PATENT DOCUMENTS

CN 101097670 1/2008
CN 107919734 A * 4/2018 ......... H01F 27/2804
(Continued)

OTHER PUBLICATIONS

European Patent Office Application Serial No. 19945815.9, Search Report dated Sep. 13, 2023, 10 pages.
(Continued)

*Primary Examiner* — Gary C Hoge
(74) *Attorney, Agent, or Firm* — LEE, HONG, DEGERMAN, KANG & WAIMEY

(57) ABSTRACT

The present disclosure is applicable to a display apparatus-related technical field, and relates to, for example, a rotating display apparatus using a light-emitting diode (LED) which is a semiconductor light-emitting device. According to the present disclosure, a rotating display apparatus using a light-emitting device, comprises: a fixed part including a motor; a rotary part located on the fixed part and rotated by the motor; and a light source module which is coupled to the rotary part, and which includes at least one panel that is radially arranged or at least one panel that is arranged along the cylindrical surface, and a first light-emitting device array having individual pixels that are arranged on each panel in the longitudinal direction, wherein sub-pixels forming the
(Continued)

individual pixel of the first light-emitting device array can be arranged along a direction orthogonal to the longitudinal direction.

19 Claims, 20 Drawing Sheets

(56) References Cited

U.S. PATENT DOCUMENTS

| | | | | |
|---|---|---|---|---|
| 10,108,082 | B1* | 10/2018 | Hoth | G09F 13/30 |
| 2007/0247519 | A1* | 10/2007 | Riaziat | H04N 13/305 348/51 |
| 2011/0164070 | A1* | 7/2011 | Sirmon | G09F 9/33 345/690 |
| 2017/0124925 | A1* | 5/2017 | Chykeyuk | G09G 3/001 |
| 2017/0223344 | A1* | 8/2017 | Kaehler | H04N 13/307 |
| 2019/0035317 | A1* | 1/2019 | Rohena | F04D 17/16 |
| 2019/0228690 | A1 | 7/2019 | Meng et al. | |
| 2019/0340962 | A1* | 11/2019 | Trehan | G09G 3/005 |
| 2020/0378595 | A1* | 12/2020 | Zhao | H01L 25/0655 |
| 2020/0387931 | A1* | 12/2020 | Bastiyali | G09F 19/02 |
| 2021/0035160 | A1* | 2/2021 | Xu | G06Q 30/0265 |
| 2021/0097906 | A1* | 4/2021 | Chykeyuk | G09G 3/001 |
| 2021/0192996 | A1* | 6/2021 | Onuki | G09F 9/37 |
| 2022/0343812 | A1* | 10/2022 | Woo | G09F 9/33 |
| 2022/0377916 | A1* | 11/2022 | Park | G09F 11/02 |
| 2022/0398954 | A1* | 12/2022 | Kim | G09F 9/33 |
| 2023/0004019 | A1* | 1/2023 | Lee | G09F 27/005 |
| 2023/0045270 | A1* | 2/2023 | Ahn | G09F 9/33 |
| 2023/0080699 | A1* | 3/2023 | Shim | B60Q 1/5035 340/425.5 |

FOREIGN PATENT DOCUMENTS

| | | |
|---|---|---|
| CN | 208093110 | 11/2018 |
| CN | 110232884 | 9/2019 |
| KR | 1020140013721 | 2/2014 |
| KR | 101853946 | 5/2018 |
| KR | 101992810 | 9/2019 |
| WO | 2016181134 | 11/2016 |

OTHER PUBLICATIONS

PCT International Application No. PCT/KR2019/012711, International Search Report dated Jun. 15, 2020, 11 pages.

* cited by examiner (a)

(b)

(c)

ROTATING DISPLAY APPARATUS USING SEMICONDUCTOR LIGHT-EMITTING DEVICE

CROSS-REFERENCE TO RELATED APPLICATIONS

This application is the National Stage filing under 35 U.S.C. 371 of International Application No. PCT/KR2019/012711, filed on Sep. 30, 2019, which claims the benefit of earlier filing date and right of priority to Korean Application No. 10-2019-0114132, filed on Sep. 17, 2019, the contents of which are all incorporated by reference herein in their entirety.

TECHNICAL FIELD

The present disclosure is applicable to display-device-related technical fields, and relates to a rotatable display device using a light-emitting diode (LED), which is a semiconductor light-emitting element.

BACKGROUND ART

Recently, in the field of display technology, display devices having excellent characteristics, such as thinness and flexibility, have been developed. Meanwhile, currently commercialized major displays are represented by a liquid crystal display (LCD) and an organic light-emitting diode (OLED).

However, the LCD has problems in which the response time is slow and it is difficult to realize flexibility, and the OLED has problems in which the lifespan thereof is short and the production yield thereof is low.

Meanwhile, a light-emitting diode (LED), which is a well-known semiconductor light-emitting element that converts current into light, has been used as a light source for displaying an image in electronic devices including information communication devices together with a GaP:N-based green LED, starting with commercialization of a red LED using a GaAsP compound semiconductor in 1962. Therefore, a method of solving the above-described problems by implementing a display using the semiconductor light-emitting element may be proposed. Such a light-emitting diode has various advantages, such as a long lifespan, low power consumption, excellent initial driving characteristics, and high vibration resistance, compared to a filament-based light-emitting element.

Meanwhile, when a light-emitting module in which light-emitting elements are arranged in one dimension is rotated and driven at a high speed according to the angle thereof, various letters, graphics, and videos may be recognized by a human due to an afterimage effect.

In general, when still images are continuously displayed at a rate of 24 or more sheets per second, a viewer recognizes the same as a video. A conventional image display device, such as a CRT, an LCD, or a PDP, displays still images at a rate of 30 to 60 frames per second, so a viewer is capable of recognizing the same as a video. As the number of still images displayed per second increases, a viewer may experience smoother video, and as the number of still images displayed per second decreases, it becomes difficult to implement smooth video.

In a rotatable afterimage display device, an emission area varies depending on the sizes and arrangement of subpixels, and a non-emission period is necessary in order to prevent crosstalk between adjacent pixels.

That is, in the rotatable afterimage display device, the sizes of the subpixels in the direction of rotation with respect to the size of the pixel vary depending on the method of arranging the subpixels, and this variation may cause a difference in the actual light emission time, leading to a reduction in the maximum brightness (luminance) of the display.

Accordingly, there may be a limitation on the depth to which luminance can be expressed, and because space for wiring is necessary when light sources are disposed in one direction, there may be a limitation on the extent to which resolution can be increased.

Therefore, there is a need for a method of overcoming the limitations on the luminance and resolution of a rotatable display device.

DISCLOSURE

Technical Task

A technical task of the present disclosure is to provide a rotatable display device using a semiconductor light-emitting element, which is capable of improving the luminance thereof.

In addition, the present disclosure provides a rotatable display device using a semiconductor light-emitting element, which is capable of improving the resolution and precision thereof.

Technical Solutions

In accordance with a first aspect for accomplishing the above objects, a rotatable display device using a light-emitting element of the present disclosure may include a fixed portion comprising a motor: a rotary portion located on the fixed portion and configured to be rotated by the motor; and a light source comprising: module including one or more first panels coupled to the rotary portion and disposed to extend radially; or one or more second panels disposed along a cylindrical surface, wherein the light source further comprises first light-emitting element arrays comprising individual pixels disposed on the one or more first panels or the one or more second panels along a longitudinal direction, wherein each of the individual pixels of the first light-emitting element arrays comprises subpixels disposed along a direction perpendicular to the longitudinal direction.

In addition, the subpixels may be controllable to sequentially emit light in the individual pixels.

In addition, the rotatable display device may further include second light-emitting element arrays disposed along a direction parallel to the longitudinal direction and including individual pixels disposed along the longitudinal direction.

In addition, each of the individual pixels of the second light-emitting element arrays may be located between corresponding pixels of the individual pixels of the first light-emitting element arrays with respect to the longitudinal direction.

In addition, the first light-emitting element arrays and the second light-emitting element arrays may be controllable to sequentially emit light.

In addition, the fixed portion and the rotary portion may be electrically coupled to each other through a wireless power transfer device.

In addition, the wireless power transfer structure may include a wireless power transmitter device provided at the fixed portion, a transmission coil coupled to the wireless power transmitter, a reception coil located at a position facing the transmission coil, and a wireless power receiver coupled to the reception coil.

In addition, the light source module may further include drivers configured to drive the first light-emitting element arrays.

In addition, the drivers may be provided on surfaces of the one or more first panels or surfaces of the one or more second panels to face an opposite direction with respect to the first light-emitting element arrays.

In addition, an image processor configured to transmit control signals to the drivers may be further included.

In addition, the image processor may transmit signals controlling the first light-emitting element arrays to display image data of a specific frame in a delayed manner.

In addition, the image processor may transmit signals controlling the first light-emitting element arrays to be sequentially driven.

In accordance with a first aspect for accomplishing the above objects, a rotatable display device using a light-emitting element of the present disclosure may include a fixed portion comprising a motor, a rotary portion located on the fixed portion and configured to be rotated by the motor, and a light source comprising one or more first panels coupled to the rotary portion and disposed to extend radially, or one or more second panels disposed along a cylindrical surface, wherein the light source further comprises: first light-emitting element arrays comprising individual pixels disposed on the one or more first panels or the one or more second panels along a longitudinal direction and second light-emitting element arrays spaced a predetermined distance apart from the first light-emitting element arrays with respect to a direction parallel to the longitudinal direction, the second light-emitting element arrays comprising individual pixels disposed along the longitudinal direction.

In addition, each of the individual pixels of the first light-emitting element arrays and the second light-emitting element arrays may include subpixels disposed along a direction perpendicular to the longitudinal direction.

In addition, the light source module may include drivers, configured to drive the first light-emitting element arrays and the second light-emitting element arrays, and an image processor, configured to transmit control signals to the drivers.

In addition, the image processor may transmit signals controlling the first light-emitting element arrays and the second light-emitting element arrays to be sequentially driven.

Advantageous Effects

According to an embodiment of the present disclosure, there are the following effects.

First, according to the present disclosure, the limitation on the physical positional relationship between subpixels may be resolved. That is, the subpixels do not need to be located in a predetermined pixel area.

In practice, the rotatable display device displays one frame when a light source module travels through one rotation, and thus the constraint on the distance between the subpixels may be ignored. Accordingly, luminance may be improved. In addition, the subpixels do not need to be disposed adjacent to each other; for example, the subpixels are capable of being disposed more densely at positions to which the subpixels have been moved parallel, and accordingly, precision and resolution may be improved.

In addition, individual subpixels may be located in different pixel spaces by individually driving the subpixels. Accordingly, a wide space may be utilized as regions for circuit wiring and mounting of light sources.

Accordingly, it may be possible to individually drive subpixels by adjusting the timing between the subpixels according to the rotational speed on the basis of a rotation afterimage, and a viewer may perceive the subpixels as being located in one pixel space.

Further, according to the present disclosure, there are additional technical effects not mentioned herein, and those skilled in the art can understand the effects through the specification and the drawings.

BEST MODE FOR DISCLOSURE

Reference will now be made in detail to embodiments of the present disclosure, examples of which are illustrated in the accompanying drawings. Wherever possible, the same reference numbers will be used throughout the drawings to refer to the same or like parts, and a redundant description thereof will be omitted. As used herein, the suffixes "module" and "unit" are added or used interchangeably to facilitate preparation of this specification, and are not intended to suggest distinct meanings or functions. In describing embodiments disclosed in this specification, relevant well-known technologies may not be described in detail in order to avoid obscuring the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining two or more drawings are also within the scope of the present disclosure.

In addition, when an element such as a layer, a region, or a substrate is described as being "on" another element, it is to be understood that the element may be directly on the other element, or there may be an intermediate element between them.

The display device described herein conceptually includes all display devices that display information with a unit pixel or a set of unit pixels. Therefore, the term "display device" may be applied not only to finished products but also to parts. For example, a panel corresponding to a part of a digital TV also independently corresponds to the display device in the present specification. Such finished products include a mobile phone, a smartphone, a laptop computer, a digital broadcasting terminal, a personal digital assistant (PDA), a portable multimedia player (PMP), a navigation system, a slate PC, a tablet PC, an Ultrabook, a digital TV, a desktop computer, and the like.

However, it will be readily apparent to those skilled in the art that the configuration according to the embodiments described herein is also applicable to new products to be developed later as display devices.

In addition, the term "semiconductor light-emitting element" mentioned in this specification conceptually includes an LED, a micro LED, and the like, and may be used interchangeably therewith.

Figure 1:
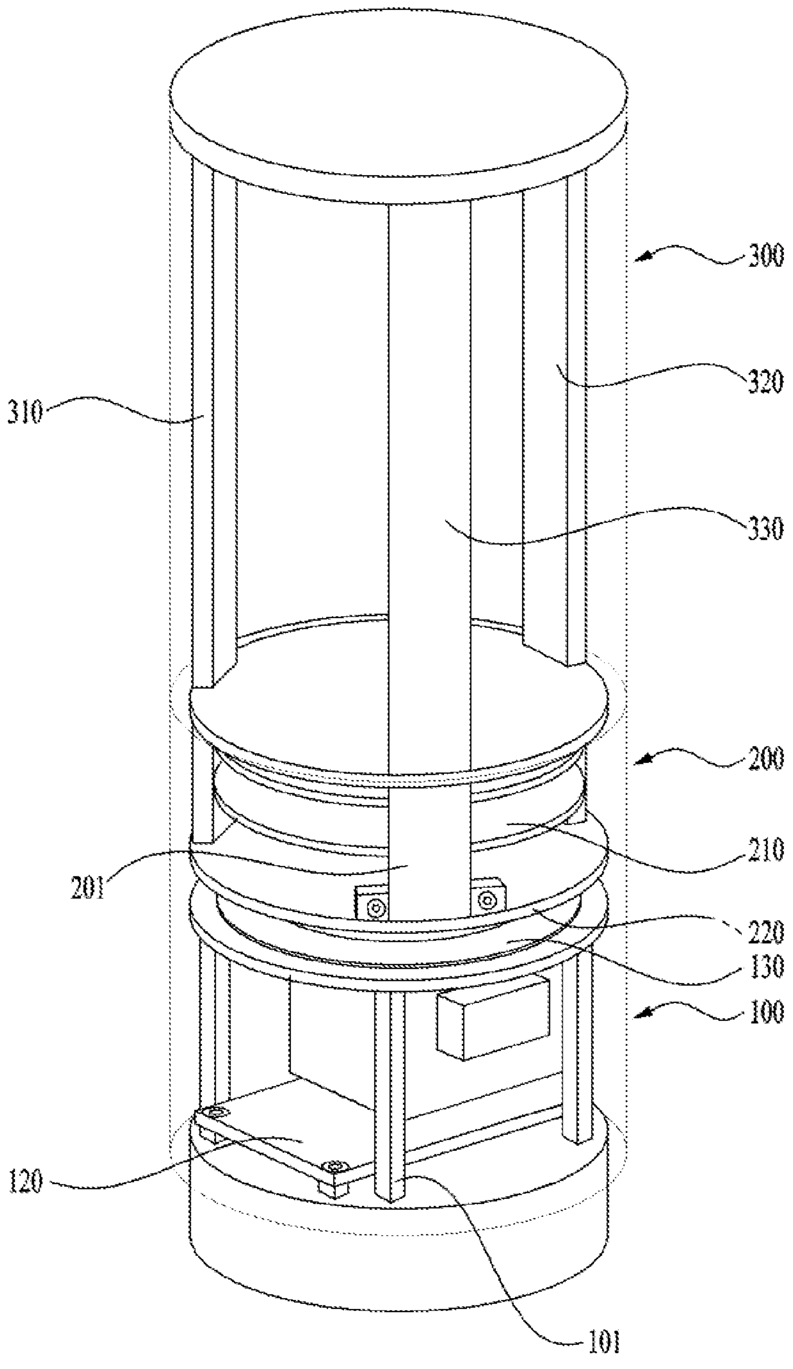
FIG. 1 is a perspective view of a rotatable display device according to a first embodiment of the present disclosure.

FIG. 1 is a perspective view of a rotatable display device according to a first embodiment of the present disclosure.

FIG. 1 illustrates a cylindrical-shaped rotatable display device in which light-emitting element arrays 311 (refer to FIG. 3) are provided on one or more panels 310, 320, and 330, which are disposed along a cylindrical surface, in the longitudinal direction of each of the panels.

Such a rotatable display device may broadly include a fixed portion 100, which includes a motor 110 (refer to FIG. 7), a rotary portion 200, which is located on the fixed portion 100 and is rotated by the motor 110, and a light source module 300, which is coupled to the rotary portion 200 and includes the light-emitting element arrays 311 mounted on the panels 310, 320, and 330 so as to be implemented as a display by creating an afterimage resulting from rotation.

In this case, the light source module 300 may include the light-emitting element arrays 311, which are mounted on one or more bar-shaped panels 310, 320, and 330, which are arranged at regular intervals on the outer circumferential surface of the cylinder in the longitudinal direction of each of the panels.

Referring to FIG. 1, the light source module 300 may include three panels 310, 320, and 330, on which the light-emitting element arrays 311 (hereinafter, first light-emitting element arrays) are provided. However, this is given merely by way of example, and the light source module 300 may include one or more panels.

In the first light-emitting element arrays 311, individual pixels may be disposed on the panels 310, 320, and 330 in the longitudinal direction of each of the panels. In this case, subpixels constituting the individual pixels may be disposed along a direction perpendicular to the longitudinal direction.

In addition, the subpixels may sequentially emit light in the individual pixels.

A detailed description of the first light-emitting element arrays 311 provided in the light source module 300 will be given later.

Each of the panels 310, 320, and 330 constituting the light source module 300 may be configured as a printed circuit board (PCB). That is, each of the panels 310, 320, and 330 may have the function of a printed circuit board. Each of the light-emitting element arrays may be implemented as an individual unit pixel, and may be disposed on a corresponding one of the panels 310, 320, and 330 in the longitudinal direction of the corresponding panel.

The panels provided with the light-emitting element arrays may be implemented as a display using an afterimage created by rotation thereof. Implementation of an afterimage display will be described later in detail.

As described above, the light source module 300 may be constituted by a plurality of panels 310, 320, and 330. However, the light source module 300 may be constituted by a single panel provided with a light-emitting element array. When the light source module 300 is constituted by a plurality of panels, as illustrated in FIG. 1, the plurality of panels may realize one frame image in a shared manner, and may thus be rotated at a lower speed when realizing a given frame image.

Meanwhile, the fixed portion 100 may include a frame structure. That is, the fixed portion 100 may include a plurality of frames 101, which are separately provided and are coupled to each other.

This frame structure may provide a space in which the motor 110 is mounted, and may provide a space in which a power supply 120 and an RF module 126 (refer to FIG. 7) are mounted.

In addition, a weight (not shown) may be mounted to the fixed portion 100 in order to reduce the influence of high-speed rotation of the rotary portion 200.

Similarly, the rotary portion 200 may include a frame structure. That is, the rotary portion 200 may include a plurality of frames 201, which are provided separately and are coupled to each other.

This frame structure may provide a space in which a driving circuit 210 for driving the light-emitting element arrays 311 in order to implement a display is mounted.

In this case, the driving shaft of the motor 110 may be fixed to a shaft-fixing portion (not shown) formed at the frame 201 of the rotary portion 200. In this way, the driving shaft of the motor 110 and the center of rotation of the rotary portion 200 may be coaxially located.

Further, the light source module 300 may be fixedly mounted on the frame 201.

Meanwhile, the fixed portion 100 and the rotary portion 200 may transfer power therebetween in a wireless power transfer manner. To this end, a transmission coil 130 for transferring wireless power may be mounted to an upper portion of the fixed portion 100, and a reception coil 220 may be mounted to a lower portion of the rotary portion 200 so as to be located at a position facing the transmission coil 130.

Figure 2:
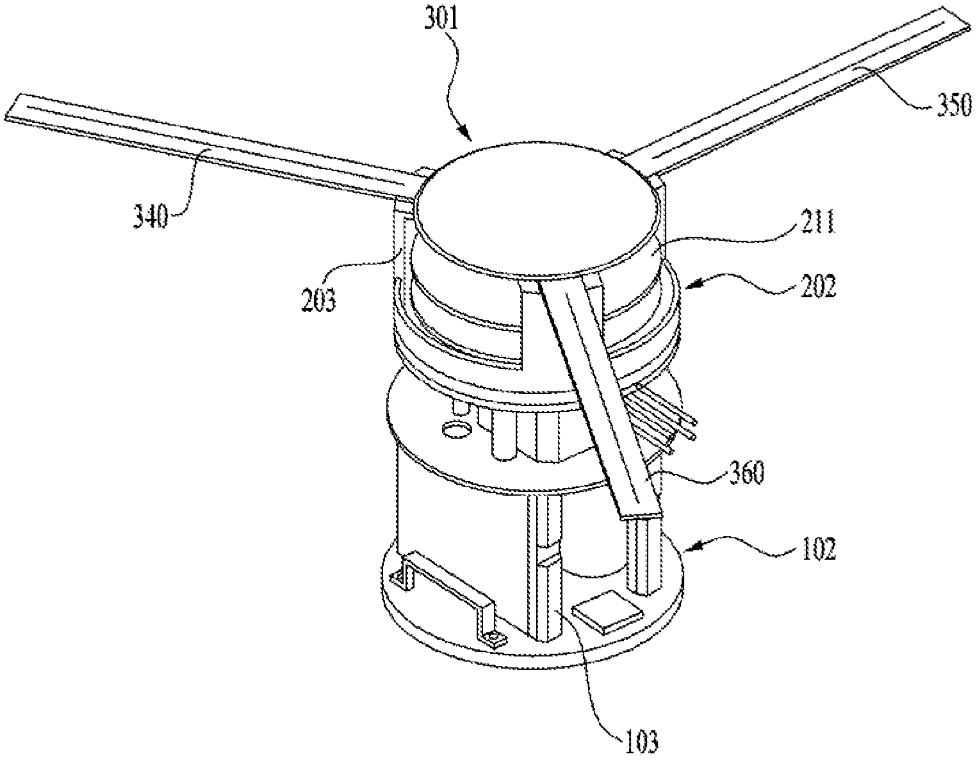
FIG. 2 is a perspective view of a rotatable display device according to a second embodiment of the present disclosure.

FIG. 2 is a perspective view of a rotatable display device according to a second embodiment of the present disclosure.

FIG. 2 illustrates a rotatable display device in which light-emitting element arrays 311 (refer to FIG. 3) are provided on blade-type panels 340, 350, and 360 in the longitudinal direction of each of the panels.

Such a rotatable display device may broadly include a fixed portion 102, which includes a motor 110 (refer to FIG. 7), a rotary portion 202, which is located on the fixed portion 102 and is rotated by the motor 110, and a light source module 301, which is coupled to the rotary portion 202 and includes the light-emitting element arrays 311 so as to be implemented as a display by creating an afterimage resulting from rotation.

As illustrated, the light source module 301 may include one or more bar-shaped panels 340, 350, and 360, which are disposed radially around the center of rotation, and first light-emitting element arrays 311, which are disposed on the panels 340, 350, and 360 in the longitudinal direction of each panel.

In the above manner, the light source module 301 may be constituted by the panels 340, 350, and 360, on which the light-emitting element arrays 311 are disposed.

The light source module 301 may be constituted by a plurality of panels 340, 350, and 360. However, the light source module 301 may be constituted by a single panel provided with a light-emitting element array. When the light source module 301 is constituted by a plurality of panels, as illustrated in FIG. 2, the plurality of panels may realize one frame image in a shared manner, and may thus be rotated at a lower speed when realizing a given frame image.

In the first light-emitting element arrays 311, individual pixels may be disposed on the panels 340, 350, and 360 in the longitudinal direction of each of the panels. In this case, subpixels constituting the individual pixels may be disposed along a direction perpendicular to the longitudinal direction.

In addition, the subpixels may sequentially emit light in the individual pixels.

A detailed description of the first light-emitting element arrays 311 provided in the light source module 301 will be given later.

Meanwhile, the fixed portion 102 may include a frame structure. That is, the fixed portion 102 may include a plurality of frames 103, which are separately provided and are coupled to each other.

This frame structure may provide a space in which the motor 110 is mounted, and may provide a space in which a power supply 120 and an RF module 126 (refer to FIG. 7) are mounted.

In addition, a weight (not shown) may be mounted to the fixed portion 102 in order to reduce the influence of high-speed rotation of the rotary portion 202.

Similarly, the rotary portion 202 may include a frame structure. That is, the rotary portion 202 may include a plurality of frames 203, which are provided separately and are coupled to each other.

This frame structure may provide a space in which a driving circuit 210 for driving the light-emitting element arrays 311 in order to implement a display is mounted.

In this case, the driving shaft of the motor 110 may be fixed to a shaft-fixing portion (not shown) formed at the frame 203 of the rotary portion 202. In this way, the driving shaft of the motor 110 and the center of rotation of the rotary portion 202 may be coaxially located.

Further, the light source module 301 may be fixedly mounted on the frame 203.

The second embodiment of the present disclosure, which has been described above with reference to FIG. 2, is substantially the same as the first embodiment, except for the difference in the configuration of the light source module 301. Thus, with regard to any aspect of the second embodiment that is not described herein, reference may be made to the description of the configuration of the first embodiment.

Figure 3:
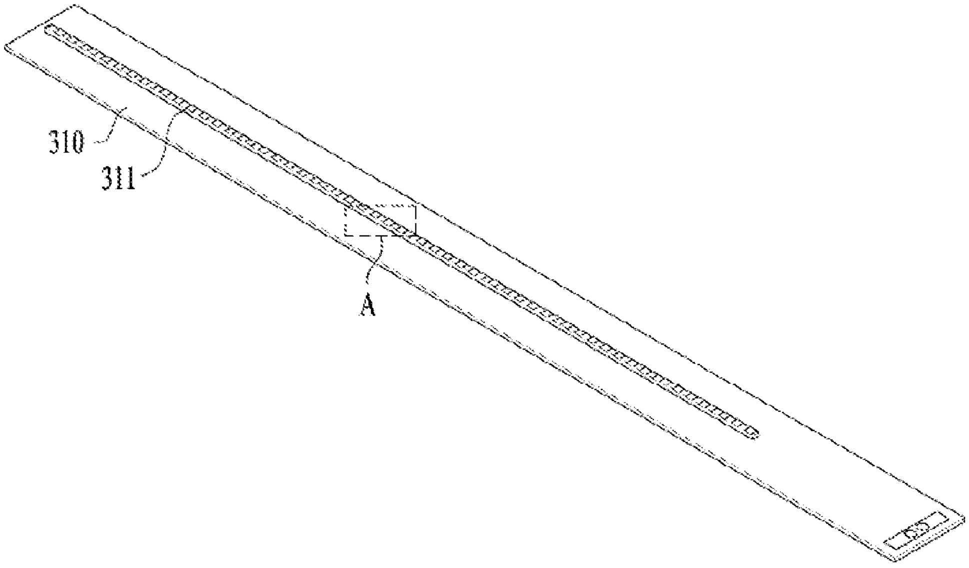
FIG. 3 is a perspective view showing the front surface of a light source module according to the present disclosure.
Figure 4:
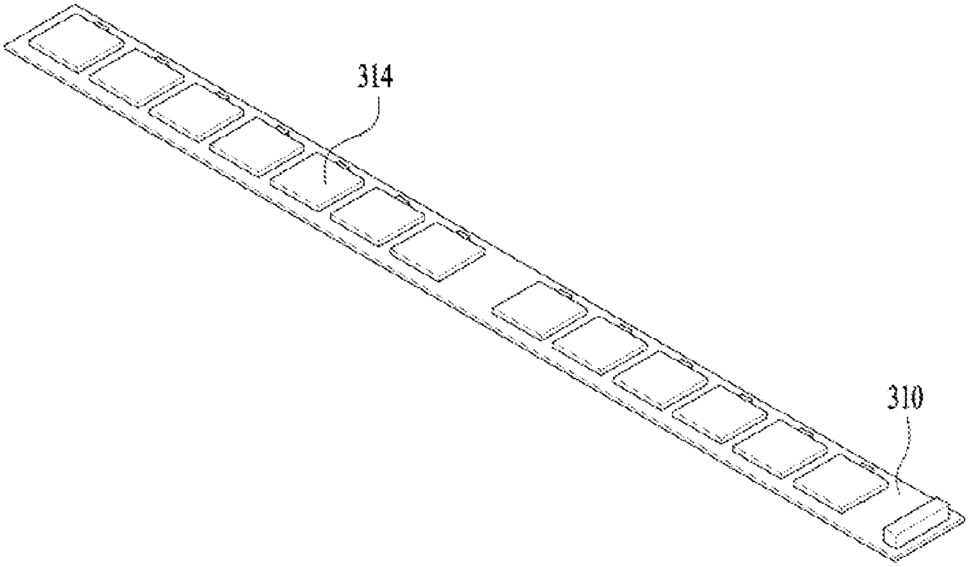
FIG. 4 is a perspective view showing the rear surface of the light source module according to the present disclosure.

FIG. 3 is a perspective view showing the front surface of the light source module according to the present disclosure, and FIG. 4 is a perspective view showing the rear surface of the light source module according to the present disclosure.

Although FIGS. 3 and 4 illustrate the first panel 310 of the first embodiment as an example, the configuration illustrated in FIGS. 3 and 4 may be identically applied not only to the other panels 320 and 330 but also to the panels 340, 350, and 360 of the second embodiment. That is, the light source module of the first embodiment and the light source module of the second embodiment may have the same configuration.

FIG. 3 illustrates one panel 310 forming the light source module 300. As mentioned above, the panel 310 may be a printed circuit board (PCB). A plurality of light-emitting elements 312 (refer to FIG. 5) may be mounted on the panel 310 so as to be disposed in one direction to form pixels, thereby constituting the light-emitting element array 311. Here, a light-emitting diode (LED) may be used as the light-emitting element.

That is, the light-emitting elements 312 are disposed in one direction on one panel 310 to form individual pixels, with the result that the light-emitting element array 311 may be provided so as to be linearly mounted.

FIG. 4 illustrates the rear surface of the panel 310. Drivers 314 for driving the light-emitting elements 312 may be mounted on the rear surface of the panel 310, which constitutes the light source module.

Since the drivers 314 are mounted on the rear surface of the panel 310, as described above, the drivers 314 may not interfere with a light-emitting surface, the influence on light emission from the light sources (the light-emitting elements) 312 due to interference may be minimized, and the area of the panel 310 may be minimized. The panel 310, having a small area, may improve the transparency of the display.

Meanwhile, the front surface of the panel 310, on which the light-emitting element array 311 is mounted, may be processed into a dark color (e.g. black) in order to improve the contrast ratio and the color expression of the display, thereby maximizing the effect of the light sources.

Figure 5:
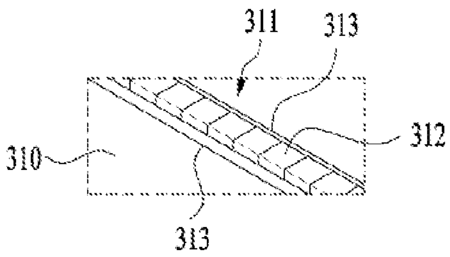
FIG. 5 is an enlarged view of portion A in FIG. 3.
Figure 6:
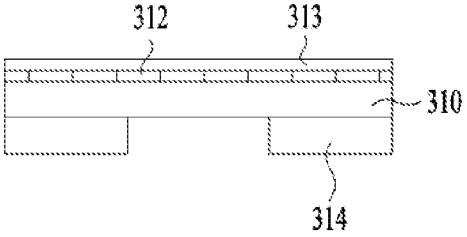
FIG. 6 is a cross-sectional view of the light source module according to the present disclosure.

FIG. 5 is an enlarged view of portion A in FIG. 3, and FIG. 6 is a cross-sectional view of the light source module according to the present disclosure.

Referring to FIG. 5, it can be seen that the individual light-emitting elements 312 are mounted linearly in one direction (the longitudinal direction of the panel). In this case, a protective portion 313 may be located outside the light-emitting elements 312 in order to protect the light-emitting elements 312.

Red, green, and blue light-emitting elements 312 may form one pixel in order to realize natural colors, and the individual pixels may be mounted in one direction on the panel 310.

Referring to FIG. 6, the light-emitting elements 312 may be protected by the protective portion 313. Further, as described above, the drivers 314 may be mounted on the rear surface of the panel 310, and may drive the light-emitting elements 312 in units of pixels or subpixels. In this case, one driver 314 may individually drive at least one pixel.

Figure 7:
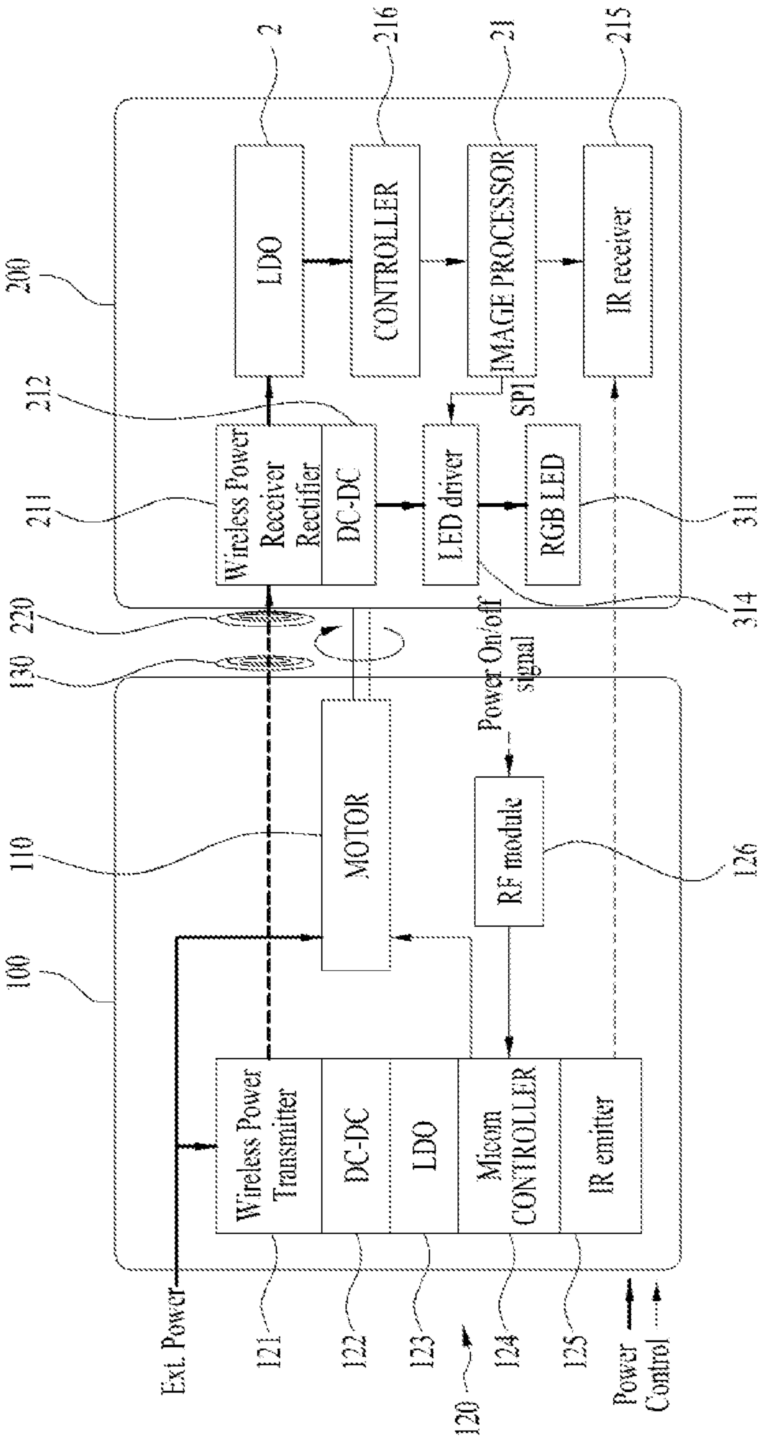
FIG. 7 is a block diagram of the rotatable display device according to the present disclosure.

FIG. 7 is a block diagram of the rotatable display device according to the present disclosure.

Hereinafter, a configuration for driving the rotatable display device will be described briefly with reference to FIG. 7. Although this configuration will be described with reference to the first embodiment described above, the same may also be identically applied to the second embodiment.

First, a driving circuit 210 may be mounted to the fixed portion 100. The driving circuit 120 may include a power supply. The driving circuit 120 may include a wireless power transmitter 121, a DC-DC converter 122, and a voltage generator 123 for supplying individual voltages.

External power may be supplied to the driving circuit 120 and the motor 110.

In addition, an RF module 126 may be provided at the fixed portion 100, so that the display may be driven in response to a signal transmitted from the outside.

Meanwhile, a means for sensing rotation of the rotary portion 200 may be provided at the fixed portion 100. Infrared radiation may be used to sense rotation. Accordingly, an IR emitter 125 may be mounted to the fixed portion 100, and an IR receiver 215 may be mounted to the rotary portion 200 at a position corresponding to the IR emitter 125.

In addition, a controller 124 may be provided at the fixed portion 100 in order to control the driving circuit 120, the motor 110, the IR emitter 125, and the RF module 126.

Meanwhile, the rotary portion 200 may include a wireless power receiver 211 for receiving a signal from the wireless power transmitter 121, a DC-DC converter 212, and a voltage generator (LDO) 213 for supplying individual voltages.

The rotary portion 200 may be provided with an image processor 216 in order to realize an image through the light-emitting element array using RGB data of an image to be displayed. The signal processed by the image processor 216 may be transmitted to the drivers 314 of the light source module, and thus an image may be realized.

In addition, a controller 214 may be mounted to the rotary portion 200 in order to control the wireless power receiver 211, the DC-DC converter 212, the voltage generator (LDO) 213, the IR receiver 215, and the image processor 216.

The image processor 216 may generate a signal for controlling light emission from the light sources of the light source module based on data of an image to be output. At this time, the data for light emission from the light source module may be internal data or external data.

The data stored in the internal device (the rotary portion 200) may be image data pre-stored in a storage device, such as a memory (an SD-card) mounted together with the image processor 216. The image processor 216 may generate a light emission control signal based on the internal data.

The image processor 216 may transmit control signals to the drivers 314 so that the first light-emitting element arrays S1, S3, and S5 (refer to FIG. 19) and the second light-emitting element arrays S2, S4, and S6 (refer to FIG. 19) display image data of a specific frame in a delayed manner.

Further, the image processor 216 may transmit control signals to the drivers 314 so that the first light-emitting element arrays S1, S3, and S5 and the second light-emitting element arrays S2, S4, and S6 are sequentially driven. Accordingly, when the light source module 300 rotates, the second light-emitting element arrays S2, S4, and S6 may be driven at positions at which the first light-emitting element arrays S1, S3, and S5 respectively corresponding thereto (adjacent thereto) are driven.

Meanwhile, the image processor 216 may receive image data from the fixed portion 100. At this time, external data may be output through an optical data transmission device, such as a photo coupler, or an RF-type data transmission device, such as a Bluetooth or Wi-Fi device.

In this case, as mentioned above, a means for sensing rotation of the rotary portion 200 may be provided. That is, the IR emitter 125 and the IR receiver 215 may be provided as a means for detecting the rotational position (speed) of the rotary portion 200, such as an absolute rotational position or a relative rotational position, in order to output light source data suitable for each rotational position (speed) during rotation of the rotary portion 200. Alternatively, this function may also be achieved using an encoder, a resolver, or a Hall sensor.

Meanwhile, data required to drive the display may be transmitted as a signal in an optical manner at low cost using the principle of a photo coupler. That is, if the fixed portion 100 and the rotary portion 200 are provided with a light emitter and a light receiver, reception of data is continuously possible even when the rotary portion 200 rotates. Here, the IR emitter 125 and the IR receiver 215 described above may be used to transmit data.

As described above, power may be transferred between the fixed portion 100 and the rotary portion 200 in a wireless power transfer (WPT) manner.

Wireless power transfer enables the supply of power without connection of a wire using a resonance phenomenon of a coil.

To this end, the wireless power transmitter 121 may convert power into an RF signal of a specific frequency, and a magnetic field generated by current flowing through the transmission coil 130 may generate an induced current in the reception coil 220.

At this time, the natural frequency of the coil and the transmission frequency for transferring actual energy may differ from each other (a magnetic induction method).

Meanwhile, the resonant frequencies of the transmission coil 130 and the reception coil 220 may be the same (a magnetic resonance method).

The wireless power receiver 211 may convert the RF signal input from the reception coil 220 into direct current, and may transmit required power to a load.

Figure 8:
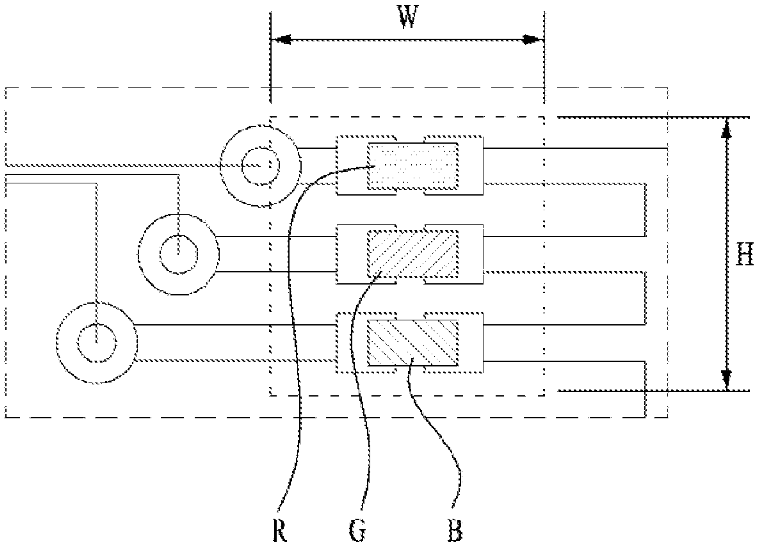
FIG. 8 is a plan view showing a pixel structure of a general rotatable display device.

FIG. 8 is a plan view showing a pixel structure of a general rotatable display device.

Referring to FIG. 8, an individual pixel may have a predetermined width W and a predetermined height H, and a plurality of subpixels for expressing natural colors may be included in the individual pixel. In general, the subpixels may include red (R), green (G), and blue (B) subpixels, and may realize natural colors using the three primary colors of light. Here, the red (R), green (G), and blue (B) subpixels are indicated by different types of shading, and the same types of shading represent subpixels having the same color, among red (R), green (G), and blue (B), throughout the present specification and the drawings. Therefore, the symbols for the respective colors will be omitted in the drawings below.

In a general rotatable display device, the subpixels may be arranged in the longitudinal direction of the panel. That is, in FIG. 8, the height (H) direction may be the longitudinal direction of the panel.

In the rotatable display device, the sizes of the subpixels in the direction of rotation with respect to the size of the pixel vary depending on the method of arranging (disposing) the subpixels. This variation in the size of the subpixels may cause a difference in the actual light emission time, leading to a reduction in the maximum brightness (luminance) of the display.

In general, a display device expresses an image in the form of a plane using a large number of pixels emitting light corresponding to information corresponding to each of the positions thereof. Such a large number of pixels are individual light source elements, and each of the individual light source elements (pixels) is composed of RGB subpixels.

An individual pixel is generally designed to have a horizontal-to-vertical ratio of 1:1 for uniform image expression. To this end, RGB subpixels have a rectangular shape.

The rectangular-shaped subpixels may be disposed through various methods according to the design purpose.

As the number of pixels per inch (PPI) increases, the human eye perceives an image as being more similar to a real picture, and thus a display having a high PPI is usually required. In order to implement a display having a high PPI, the size of a pixel may be reduced. However, the size of a pixel is not capable of being reduced to be equal to or less than the sum of the sizes of RGB subpixels that constitute a light source.

In a conventional display, the total size of subpixels disposed through other methods is the same as the actual emission area. However, in the rotatable display device using an afterimage according to the present disclosure, the positions of the subpixels move over time, and thus the actual emission area (active pixel) varies as in Equation 1 below.

Subpixel size in direction tangential to rotation(horizontal direction)×movement time <Equation 1>

Due to this characteristic of the afterimage display, crosstalk between adjacent pixels may occur. Therefore, the rotatable display device requires a non-emission period in order to prevent crosstalk between pixels.

The minimum non-emission period required for prevention of crosstalk corresponds to the length of a subpixel in the direction of rotation.

Figure 9:
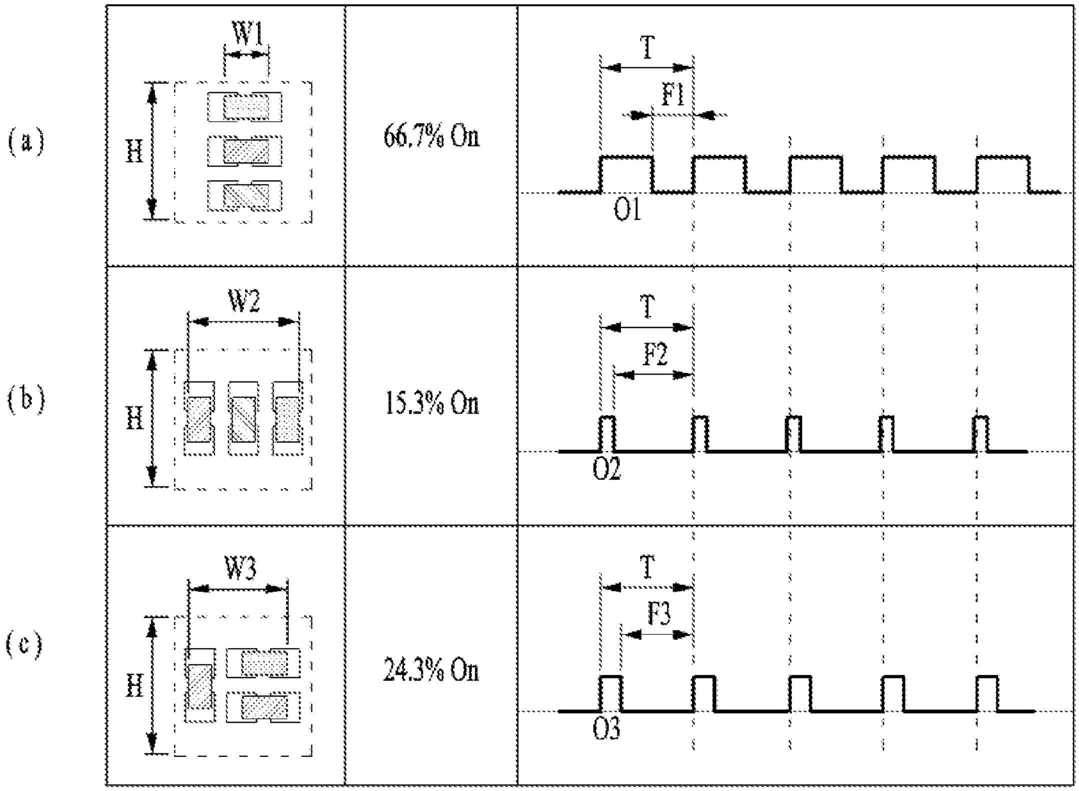
FIG. 9 is a table showing a light emission time depending on the disposition of subpixels in the rotatable display device.

FIG. 9 is a table showing a light emission time depending on the disposition of subpixels in the rotatable display device.

As described above, the rotatable afterimage display device has a different emission area depending on the size and disposition of the subpixels, and needs a non-emission period in order to prevent crosstalk between adjacent pixels.

That is, in the rotatable afterimage display device, the sizes of the subpixels in the direction of rotation with respect to the size of the pixel vary depending on the method of arranging the subpixels, and this variation may cause a difference in the actual light emission time, leading to a reduction in the maximum brightness (luminance) of the display.

FIG. 9 illustrates a difference in the light emission time depending on the disposition of the subpixels in the pixel having a given size.

FIG. 9(*a*) illustrates an example in which the subpixels are disposed in the vertical direction (i.e. the longitudinal direction of the panel), as shown in FIG. 8. In this case, when the total light emittable time for each pixel is T, the non-emission period corresponds to F1. That is, light may be emitted for a time indicated by "O1". The ratio of the light emission time to the total light emittable time T for each pixel may be 66.7%.

FIG. 9(*b*) illustrates an example in which the subpixels are disposed in the horizontal direction (i.e. a direction perpendicular to the longitudinal direction of the panel). In this case, when the total light emittable time for each pixel is T, the non-emission period corresponds to F2. That is, light may be emitted for a time indicated by "O2". The ratio of the light emission time to the total light emittable time T for each pixel may be 15.3%.

FIG. 9(*c*) illustrates an example in which the subpixels are disposed both in the horizontal direction and in the vertical direction. In this case, when the total light emittable time for each pixel is T, the non-emission period corresponds to F3. That is, light may be emitted for a time indicated by "O3". The ratio of the light emission time to the total light emittable time T for each pixel may be 24.3%.

Accordingly, when the active pixels are arranged so as to have a shorter horizontal length in consideration of rotational movement, the light emission time of each subpixel may increase, and thus the luminance of the display may be improved.

When the RGB subpixels are located in each pixel having a given size, the disposition of the light sources for realizing the maximum luminance corresponds to a pixel disposition structure in which the light-emitting diodes (LEDs) are arranged in the vertical direction (i.e. the longitudinal direction of the panel) such that the subpixels have the shortest horizontal length.

Figure 10:
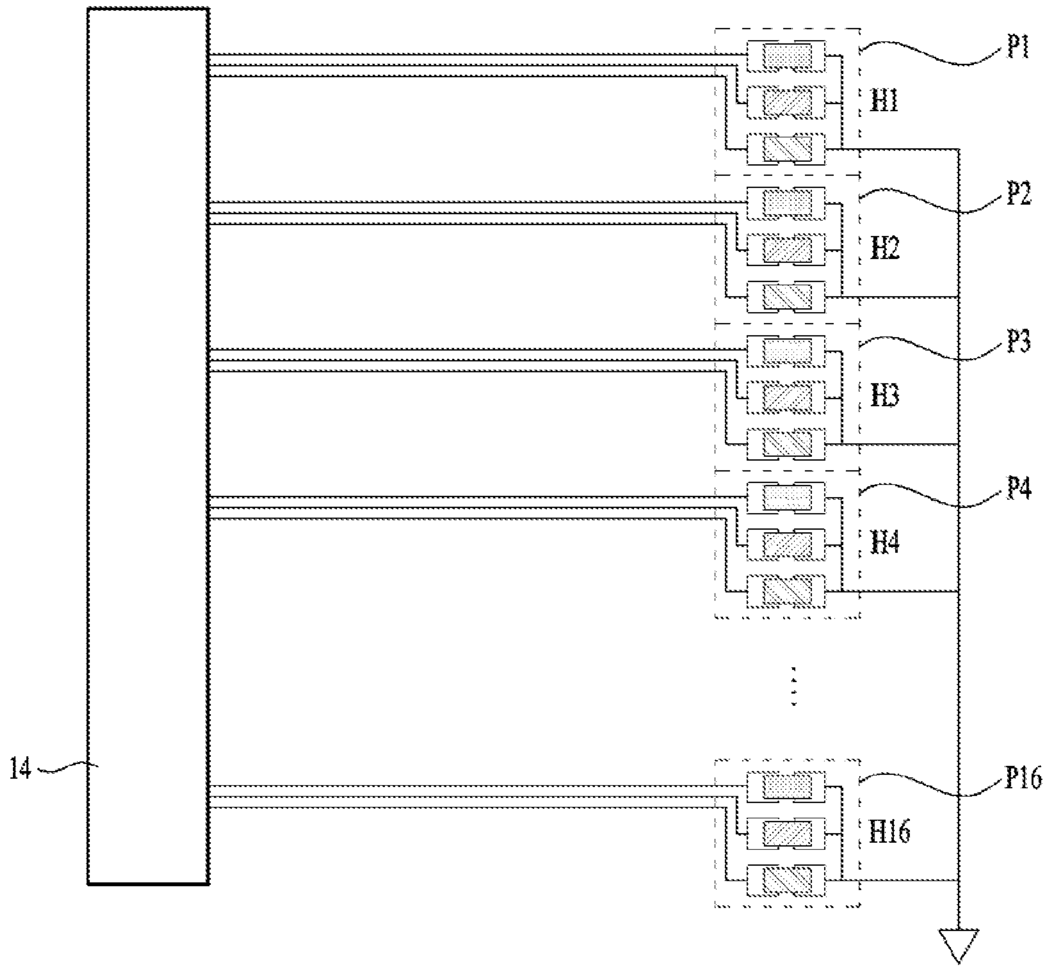
FIG. 10 is a schematic diagram showing the arrangement of the pixels corresponding to FIG. 9(*a*).

FIG. 10 is a schematic diagram showing the arrangement of the pixels corresponding to FIG. 9(*a*).

FIG. 10 illustrates a pixel disposition in which the subpixels are arranged in the vertical direction (i.e. the longitudinal direction of the panel). That is, it can be seen that the direction in which the pixels P1, P2, . . . , and P16 are disposed is the same as the direction in which the subpixels are disposed. In this case, the driver 14 may drive a unit number of pixels. In FIG. 10, the unit number may be 16.

Figure 11:
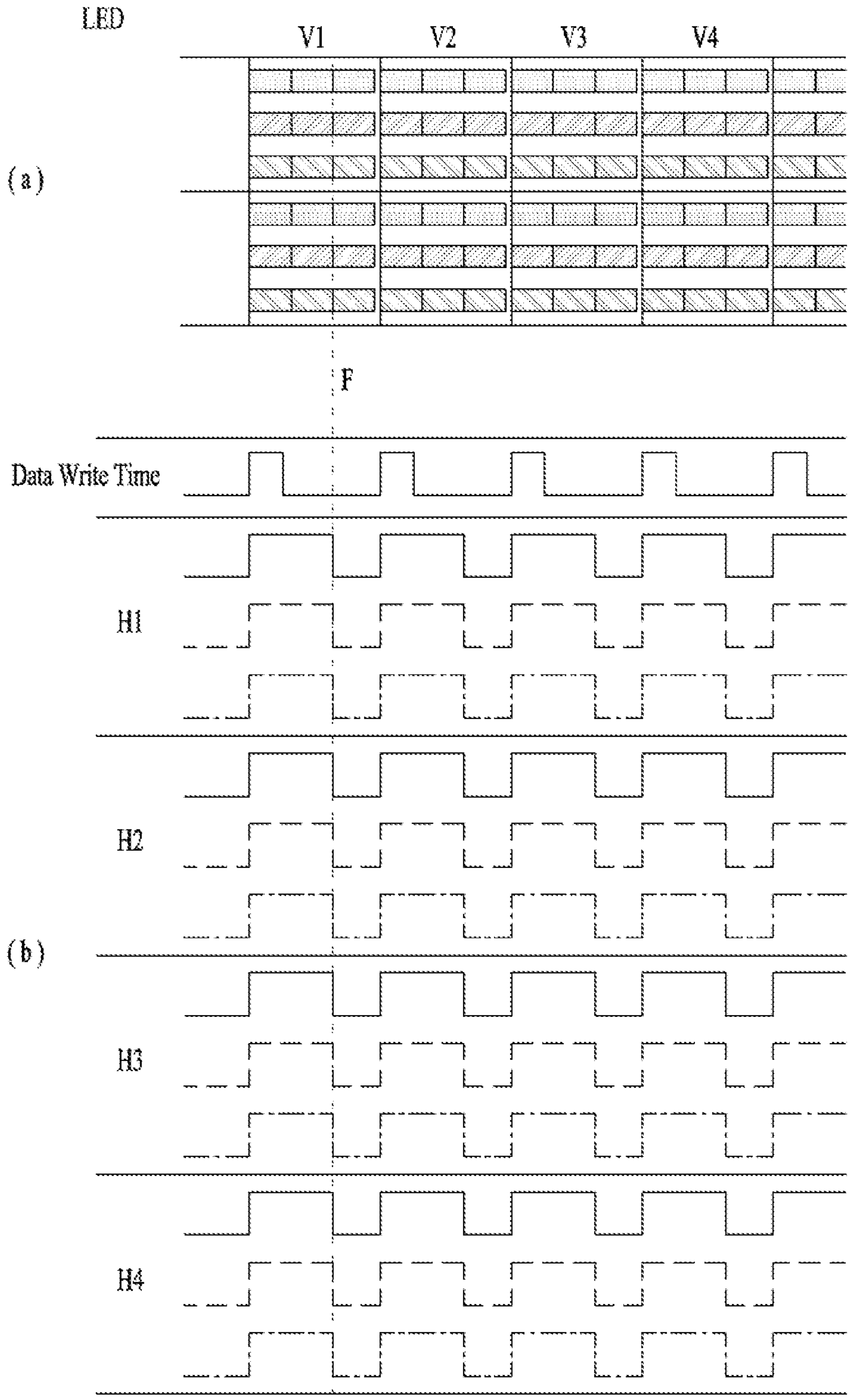
FIG. 11 is a diagram showing a light emission pattern and a light emission time depending on the arrangement of the pixels shown in FIG. 10.

FIG. 11 is a diagram showing a light emission pattern and a light emission time depending on the arrangement of the pixels shown in FIG. 10.

FIG. 11(*a*) shows a light emission pattern depending on the arrangement of the pixels shown in FIG. 10. In addition, FIG. 11(*b*) shows a light emission time depending on the arrangement of the pixels shown in FIG. 10.

The respective subpixels may be repeatedly powered on and off according to the positions V1, V2, V3, and V4 of each pixel during rotation thereof. In this case, light may be emitted for a relatively long time within a relatively wide range.

Figure 12:
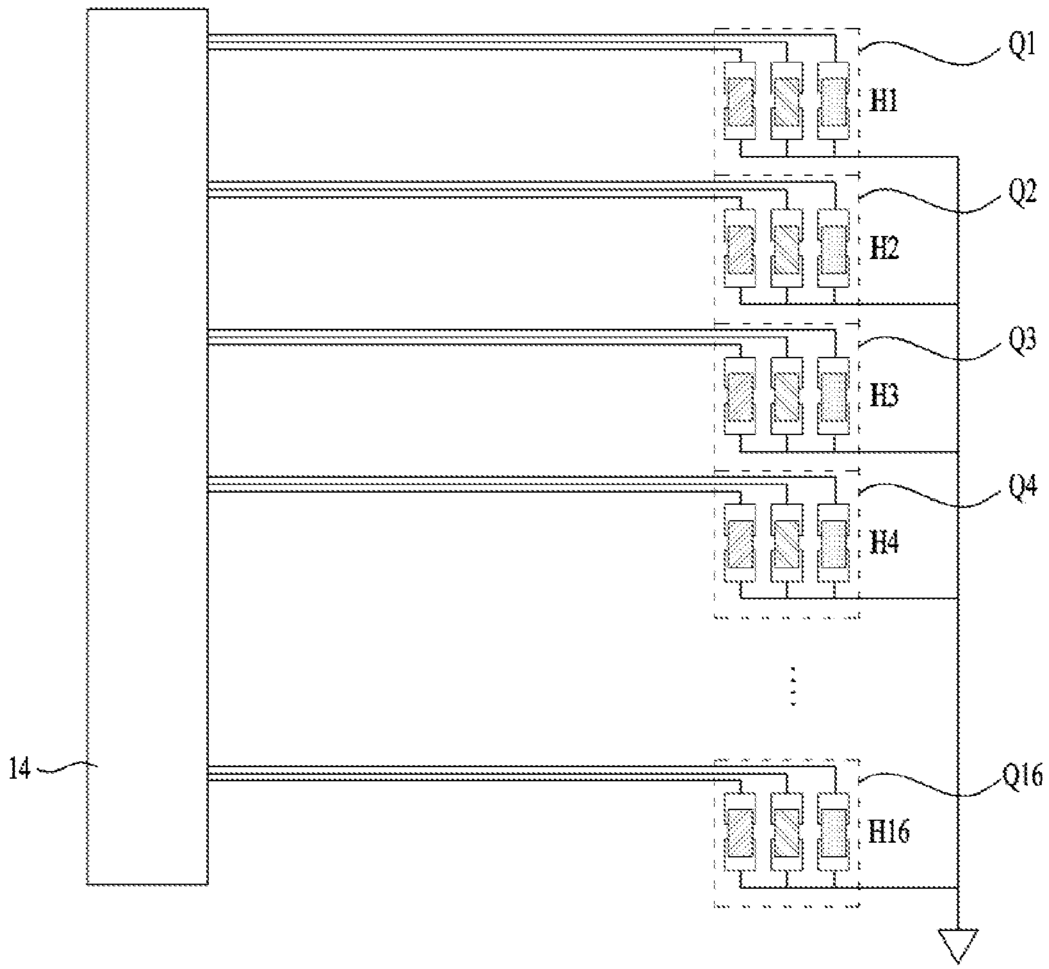
FIG. 12 is a schematic diagram showing the arrangement of the pixels corresponding to FIG. 9(*b*).

FIG. 12 is a schematic diagram showing the arrangement of the pixels corresponding to FIG. 9(*b*).

FIG. 12 illustrates a pixel disposition in which the subpixels are arranged in the horizontal direction (i.e. a direction perpendicular to the longitudinal direction of the panel). That is, it can be seen that the direction in which the pixels Q1, Q2, . . . , and Q16 are disposed is perpendicular to the direction in which the subpixels are disposed. In this case, the driver 14 may drive a unit number of pixels. In FIG. 11, the unit number may be 16.

Figure 13:
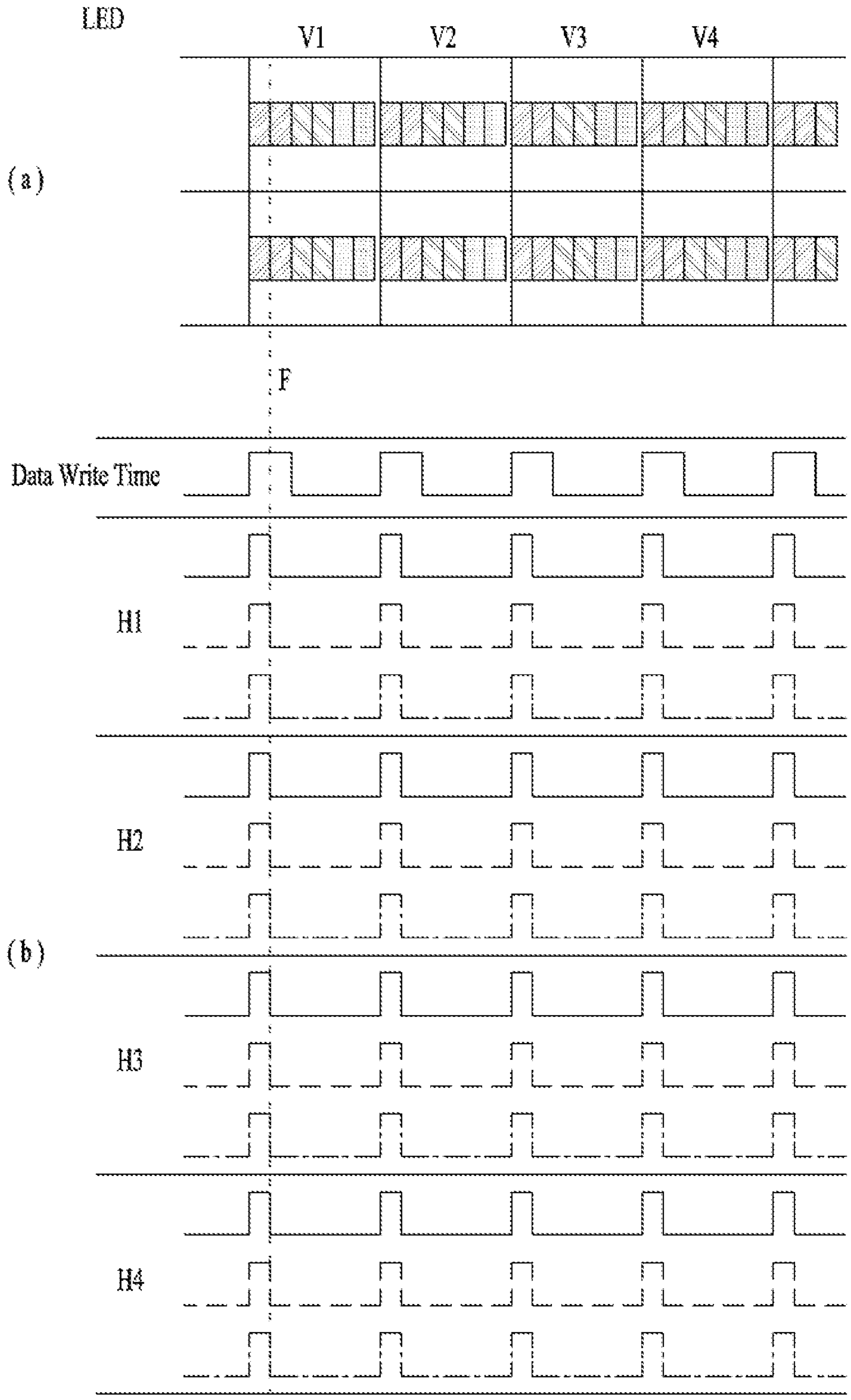
FIG. 13 is a diagram showing a light emission pattern and a light emission time depending on the arrangement of the pixels shown in FIG. 12.

FIG. 13 is a diagram showing a light emission pattern and a light emission time depending on the arrangement of the pixels shown in FIG. 12.

FIG. 13(*a*) shows a light emission pattern depending on the arrangement of the pixels shown in FIG. 12. In addition, FIG. 13(*b*) shows a light emission time depending on the arrangement of the pixels shown in FIG. 12.

The respective subpixels may be repeatedly powered on and off according to the positions V1, V2, V3, and V4 of each pixel during rotation thereof. In this case, light may be emitted for a relatively short time within a relatively narrow range.

As such, as the size of the pixel with respect to the size of the subpixel decreases, the actual light emission time may become shorter. This means that, when the size of the light source is uniform, as the precision (PPI) of the display increases (as the size of the pixel decreases), the actual light emission time becomes shorter (the luminance of the display decreases).

However, the light emission time of the pixel may be increased by improving the arrangement of light sources or the method of driving the same so as to reduce the size of the subpixel that actually emits light without reducing the size of the light source (LED). Accordingly, the luminance of the display may be improved.

When a LED having a given size is used, and given the same constraints on circuit configuration, luminance and precision (PPI) may be improved in the following two cases:

(1) the case of arranging the active pixels so as to have a relatively short horizontal length, and (2) the case of individually driving the subpixels.

Therefore, the present disclosure provides a rotatable display device capable of improving luminance and precision (PPI) in consideration of the above two cases.

In this way, when the rotatable afterimage display is implemented, if the subpixels are individually driven, a viewer who is viewing the display may perceive the subpixels R, G, and B, which are located at different positions, as being located in one pixel space.

Figure 14:
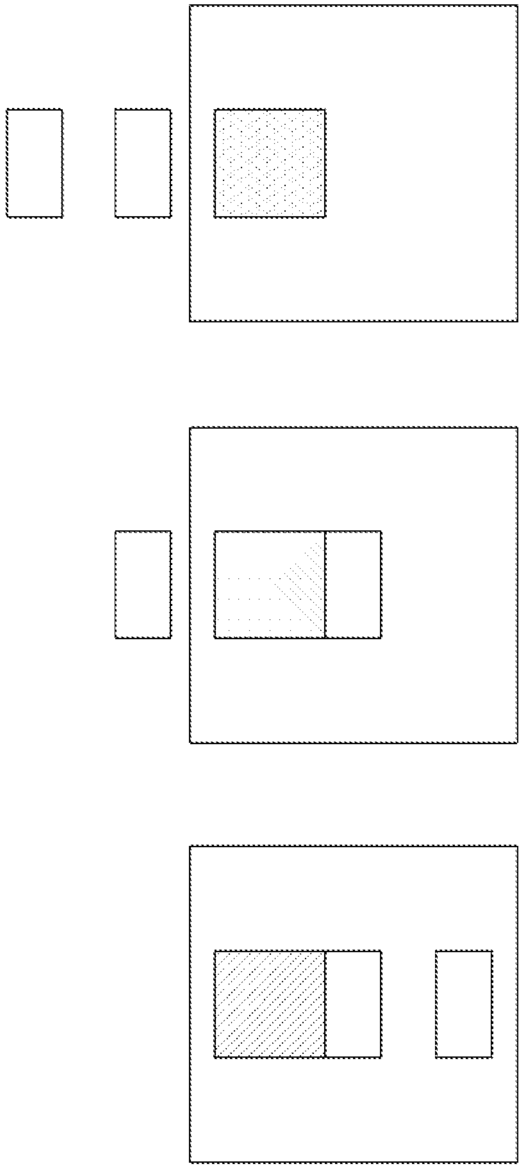
FIG. 14 is a conceptual diagram showing the state in which subpixels are individually driven in a rotatable display device according to an embodiment of the present disclosure.
Figure 15:
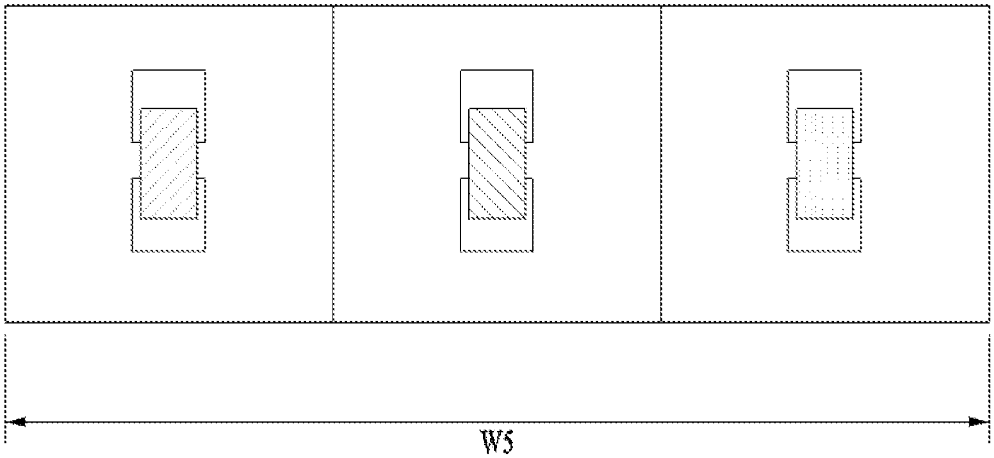
FIG. 15 is a plan view showing the arrangement of subpixels in a rotatable display device according to an embodiment of the present disclosure.

FIG. 14 is a conceptual diagram showing the state in which subpixels are individually driven in a rotatable display device according to an embodiment of the present disclosure. In addition, FIG. 15 is a plan view showing the arrangement of subpixels in a rotatable display device according to an embodiment of the present disclosure.

In FIG. 14, a large rectangle may indicate an individual pixel area. First, when a corresponding subpixel is located in this pixel area due to rotation of the light-emitting module, the subpixel may emit light.

That is, referring to FIG. 14(*a*), first, a red (sub)-pixel may be located in this pixel area, and may emit light. Thereafter, when a green pixel is located in the pixel area by further rotation by a predetermined angle, the red pixel may be turned off, and the green pixel may emit light. Thereafter, when a blue pixel is located in the pixel area by further rotation by a predetermined angle, the green pixel may be turned off, and the blue pixel may emit light.

As described above, according to the present disclosure, subpixels may be individually driven so as to sequentially emit light in a predetermined pixel area. Then, the limitation on the physical positional relationship between the subpixels may be resolved. That is, the subpixels do not need to be located in a predetermined pixel area.

For example, as shown in FIG. 15, the restriction on the distance between individual subpixels is resolved, and a set of subpixels is capable of being disposed within a width W5, greater than the width W of a conventional individual pixel. That is, the distance between the respective subpixels may be longer than the distance between subpixels in a structure in which the subpixels emit light simultaneously. In detail, the subpixels may be located so as to be spaced apart from each other by an allowable afterimage distance of the rotatable afterimage display device.

In practice, the rotatable display device displays one frame when the light source module travels through one rotation, and thus the constraint on the distance between the subpixels may be ignored. Accordingly, luminance may be improved. In addition, the subpixels do not need to be disposed adjacent to each other; for example, the subpixels are capable of being disposed more densely at positions to which the subpixels have been moved parallel, and accordingly, precision may be improved.

In addition, the individual subpixels may be located in different pixel spaces by individually driving the subpixels. Accordingly, a wide space may be utilized as regions for circuit wiring and mounting of light sources.

Accordingly, it may be possible to individually drive the subpixels by adjusting the timing between the subpixels according to the rotational speed on the basis of a rotation afterimage, and a viewer may perceive the subpixels as being located in one pixel space.

Hereinafter, this example will be described in more detail.

Figure 16:
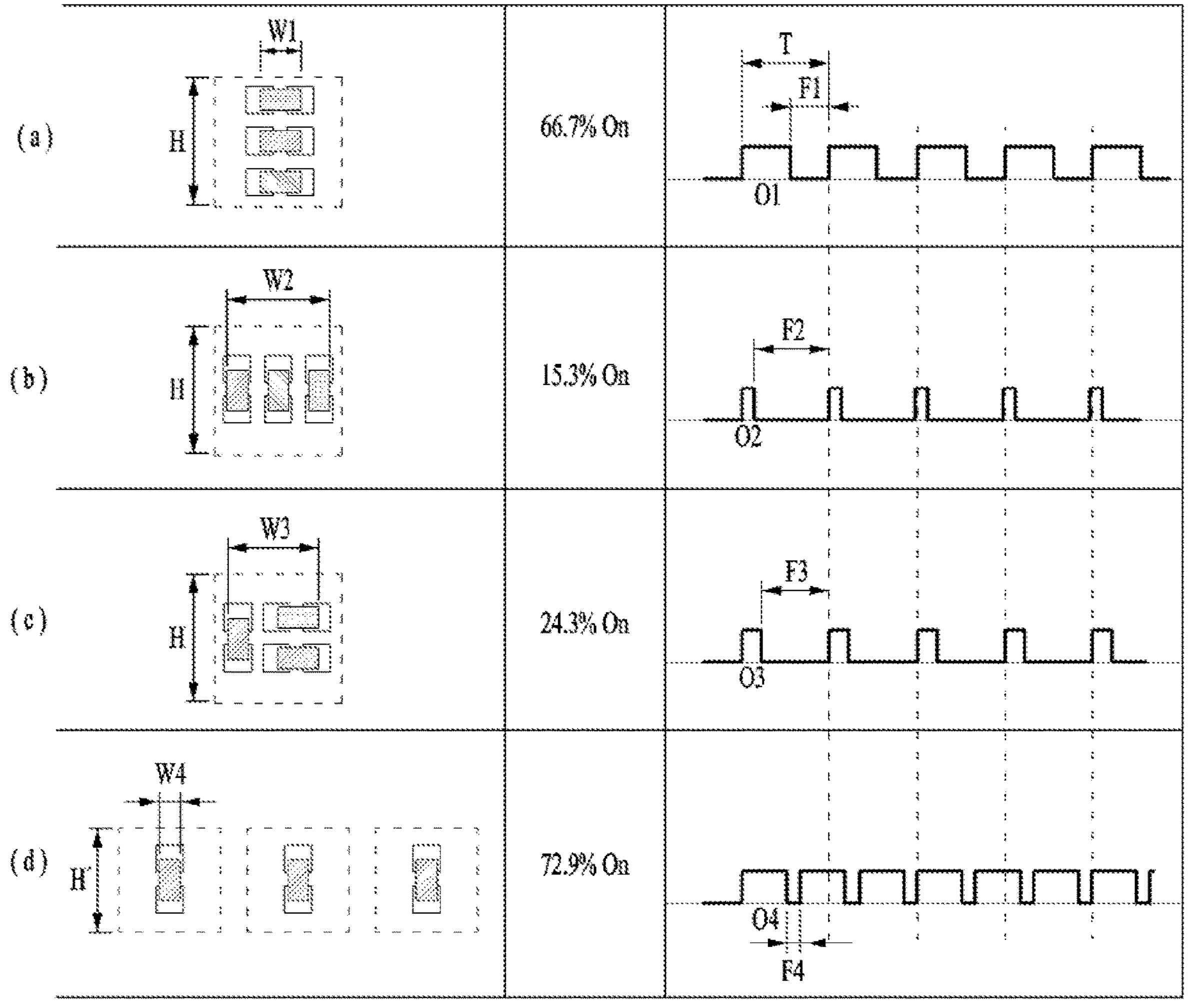
FIG. 16 is a table showing a light emission time depending on the disposition of subpixels according to an embodiment of the present disclosure.

FIG. 16 is a table showing a light emission time depending on the disposition of subpixels according to an embodiment of the present disclosure.

What is illustrated in FIGS. 16(*a*) to 16(*c*) is the same as what is illustrated in FIG. 9. FIG. 16(*d*) illustrates an example of disposition of the subpixels in the above-described case in which the subpixels are individually driven.

In this case, the subpixels may be disposed along a direction perpendicular to the longitudinal direction of the panel, similar to the case (b). Accordingly, the individual subpixel has a pixel width W4 smaller than that in the three cases (a) to (c).

However, since these subpixels are capable of being individually (sequentially) driven, when the total light emittable time for each pixel is T, the non-emission period corresponds to F4. That is, light may be emitted for a time indicated by "O4". The ratio of the light emission time to the total light emittable time T for each pixel may be 72.9%. Accordingly, according to the present disclosure, the luminance of the rotatable display device may be improved.

Figure 17:
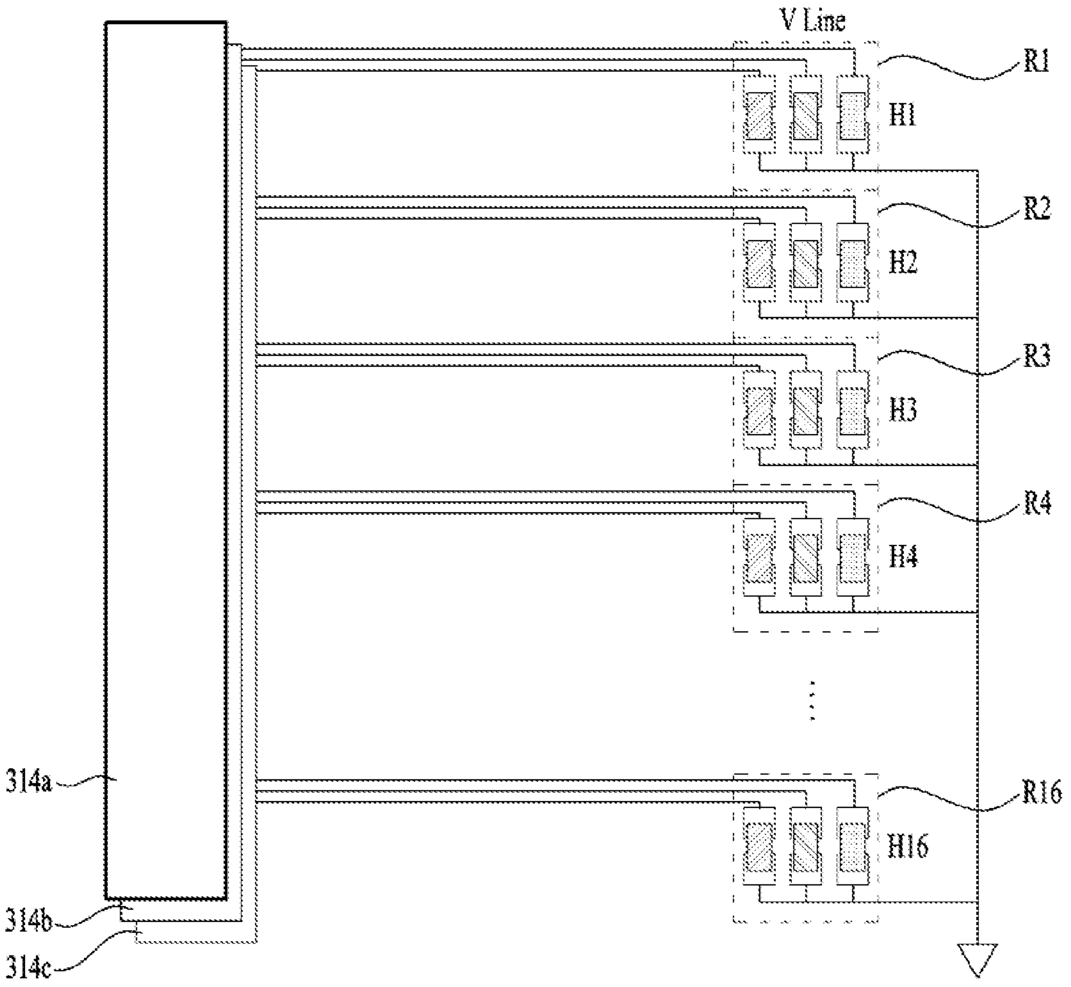
FIG. 17 is a schematic diagram showing the arrangement of pixels according to an embodiment of the present disclosure.

FIG. 17 is a schematic diagram showing the arrangement of pixels according to an embodiment of the present disclosure. That is, FIG. 17 illustrates an example of arrangement of pixels according to the arrangement of the subpixels corresponding to FIG. 16(*d*).

FIG. 17 illustrates a pixel disposition in which the subpixels are arranged in the horizontal direction (i.e. a direction perpendicular to the longitudinal direction of the panel). That is, it can be seen that the direction in which the pixels R1, R2, . . . , and R16 are disposed is perpendicular to the direction in which the subpixels are disposed.

In this case, each of drivers 314*a*, 314*b*, and 314*c* may drive subpixels having a corresponding color in a unit number of pixels. For example, the first driver 314*a* may drive red subpixels at a first timing in the unit number of pixels. In addition, the second driver 314*b* may drive green subpixels at a second timing in the unit number of pixels. In addition, the third driver 314*c* may drive blue subpixels at a third timing in the unit number of pixels. In FIG. 17, the unit number may be 16.

Here, each of the first timing, the second timing, and the third timing may be a timing at which a corresponding one of the red pixel, the green pixel, and the blue pixel emits light at a given position (pixel area) with respect to the direction of rotation.

Figure 18:
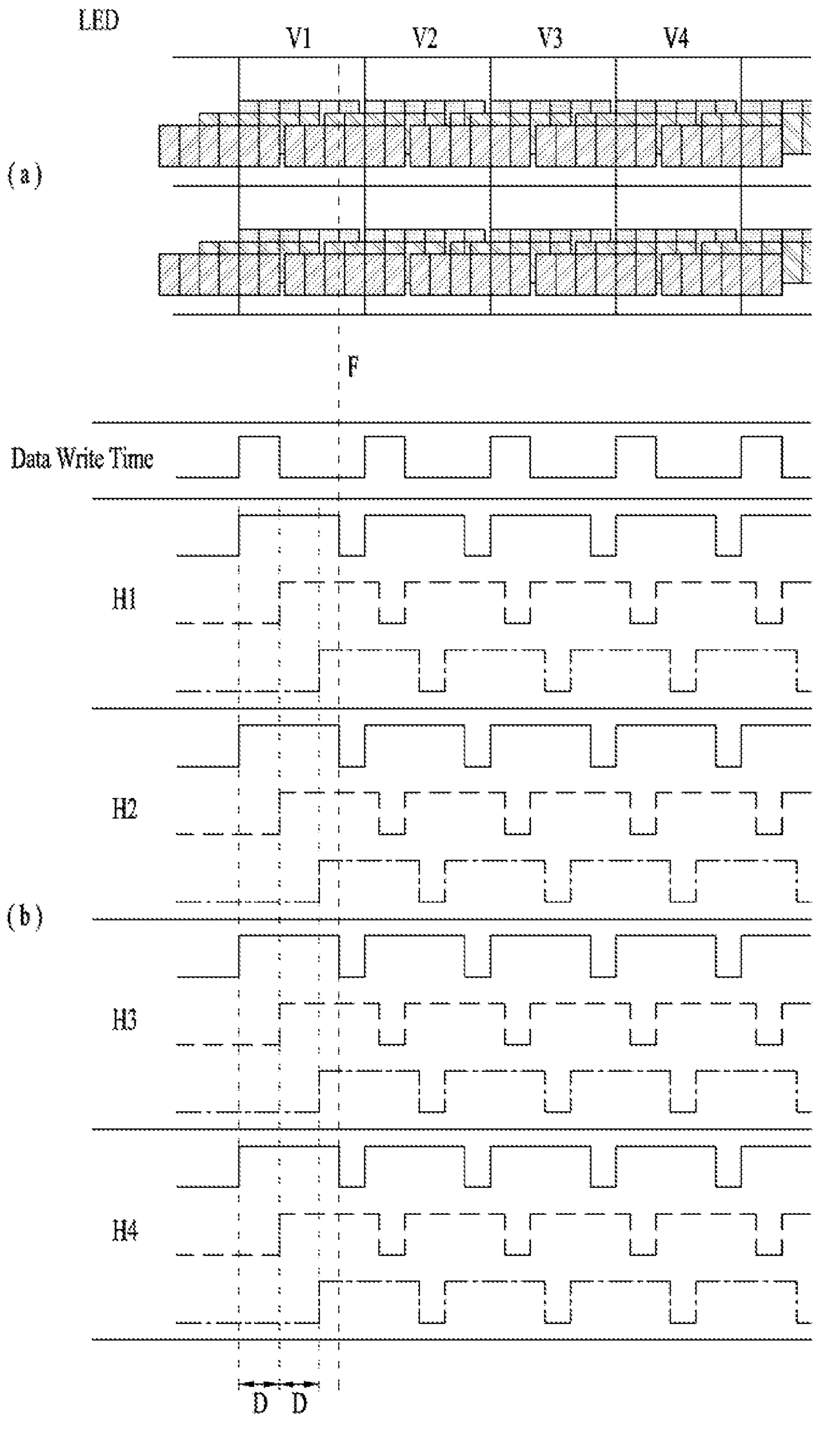
FIG. 18 is a diagram showing a light emission pattern and a light emission time depending on the arrangement of the pixels shown in FIG. 17.

FIG. 18 is a diagram showing a light emission pattern and a light emission time depending on the arrangement of the pixels shown in FIG. 17.

FIG. 18(*a*) shows a light emission pattern depending on the arrangement of the pixels shown in FIG. 17. In addition, FIG. 18(*b*) shows a light emission time depending on the arrangement of the pixels shown in FIG. 17.

The respective subpixels may be repeatedly powered on and off according to the positions V1, V2, V3, and V4 of each pixel during rotation thereof.

In this case, as described above, at the first timing, the red (sub)-pixel may be located in one pixel area, and may emit light. Thereafter, when the green pixel is located in this pixel area by further rotation by a predetermined angle, at the second timing, the red pixel may be turned off, and the green pixel may emit light. Thereafter, when the blue pixel is located in this pixel area by further rotation by a predetermined angle, at the third timing, the green pixel may be turned off, and the blue pixel may emit light.

Here, each of the first timing, the second timing, and the third timing may be a timing at which a corresponding one of the red pixel, the green pixel, and the blue pixel emits light at a given position (pixel area) with respect to the direction of rotation. In this case, the time D between the respective timings may be determined based on the disposition of the active pixels and the rotational speed of the rotatable display.

Figure 19:
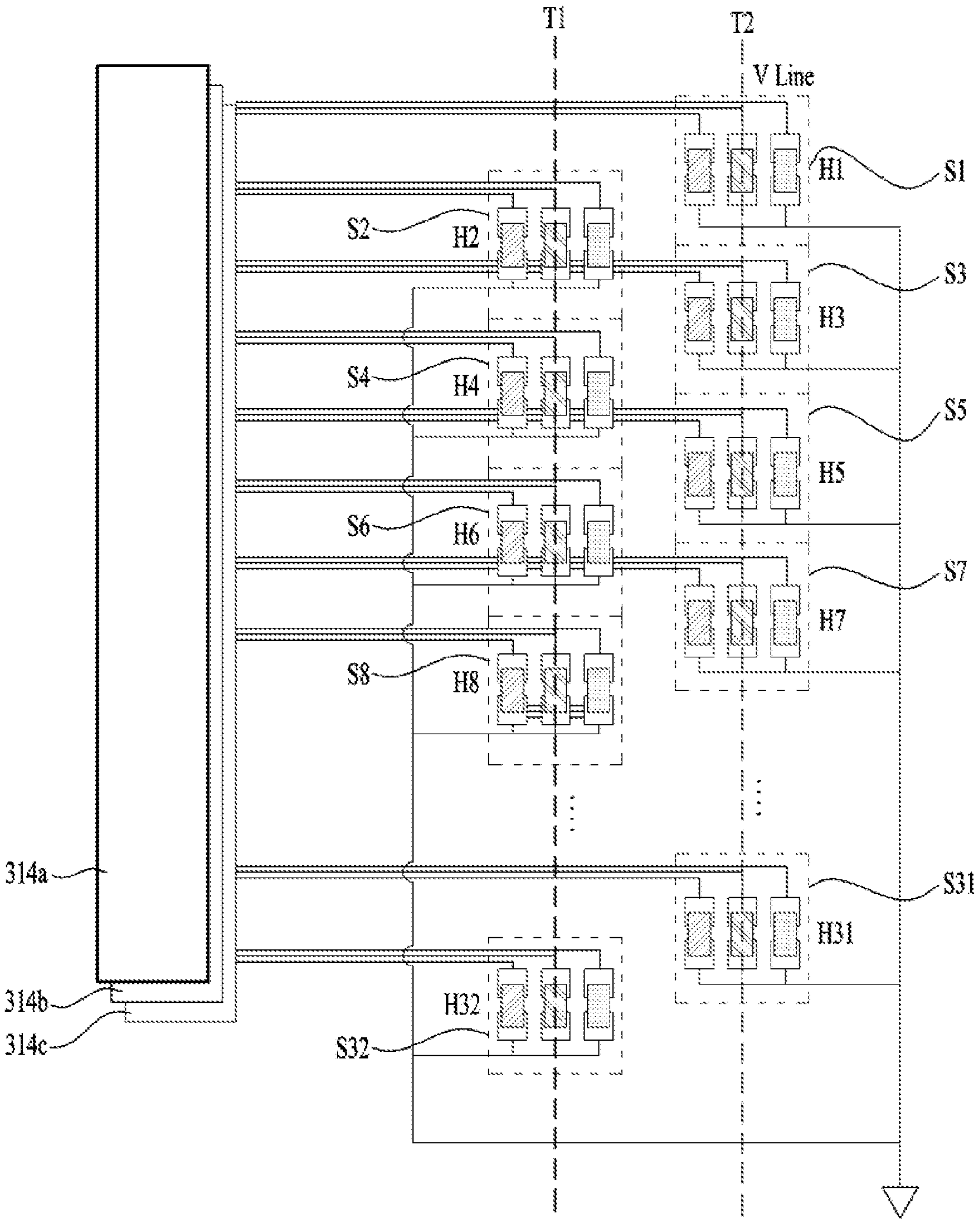
FIG. 19 is a schematic diagram showing the arrangement of pixels according to another embodiment of the present disclosure.

FIG. 19 is a schematic diagram showing the arrangement of pixels according to another embodiment of the present disclosure. That is, FIG. 19 illustrates another example of arrangement of pixels according to the arrangement of the subpixels corresponding to FIG. 16(*d*). Referring to FIG. 19, in the state in which a first light-emitting element array, which is disposed in the longitudinal direction of the panel, is located along a line T2, there may be further provided a second light-emitting element array, which is spaced a predetermined distance apart from the first light-emitting element array along a direction parallel to the longitudinal direction and in which individual pixels are disposed in the longitudinal direction (along a line T1).

That is, the first light-emitting element array described above may correspond to the pixels S1, S3, S5, . . . , and, S31 located in the line T2, and the second light-emitting element array may correspond to the pixels, S2, S4, S6, . . . , and S32 located in the line T1.

In this case, as illustrated, each of the individual pixels S2, S4, S6, . . . , and S32 of the second light-emitting element array may be located between two adjacent ones of the individual pixels S1, S3, S5, . . . , and S31 of the first light-emitting element array in the longitudinal direction of the panel.

In general, due to connection wiring for a light source (LED) constituting each subpixel, an interval of a certain distance or greater is inevitably formed between two adjacent pixels in one light-emitting element array, for example, between the first pixel S1 and the second pixel S3 in the first light-emitting element array. That is, there may be a limitation in minimizing the interval between two adjacent pixels.

However, as described above, since the spatial constraint of the subpixels is eliminated by individually (sequentially) driving the subpixels, additional pixels may be disposed between the individual pixels.

That is, since the first pixel S1 and the second pixel S3 are spaced a predetermined distance apart from each other, the pixel S2 may be additionally disposed at a position without a spatial constraint therebetween. Accordingly, the precision of the pixels may be improved, and thus the resolution of the display may be improved.

In this case, each of drivers 314*a*, 314*b*, and 314*c* may drive subpixels having a corresponding color in a unit number of pixels. For example, the first driver 314*a* may drive red subpixels of the first light-emitting element array at the first timing and may drive red subpixels of the second light-emitting element array at the second timing in the unit number of pixels. In addition, the second driver 314*b* may drive green subpixels of the first light-emitting element array at the first timing and may drive green subpixels of the second light-emitting element array at the second timing in the unit number of pixels. In addition, the third driver 314*c* may drive blue subpixels of the first light-emitting element array at the first timing and may drive blue subpixels of the second light-emitting element array at the second timing in the unit number of pixels.

In FIG. 19, the unit number may be 32. That is, when drivers having given specifications are used, resolution and precision may be doubled.

Figure 20:
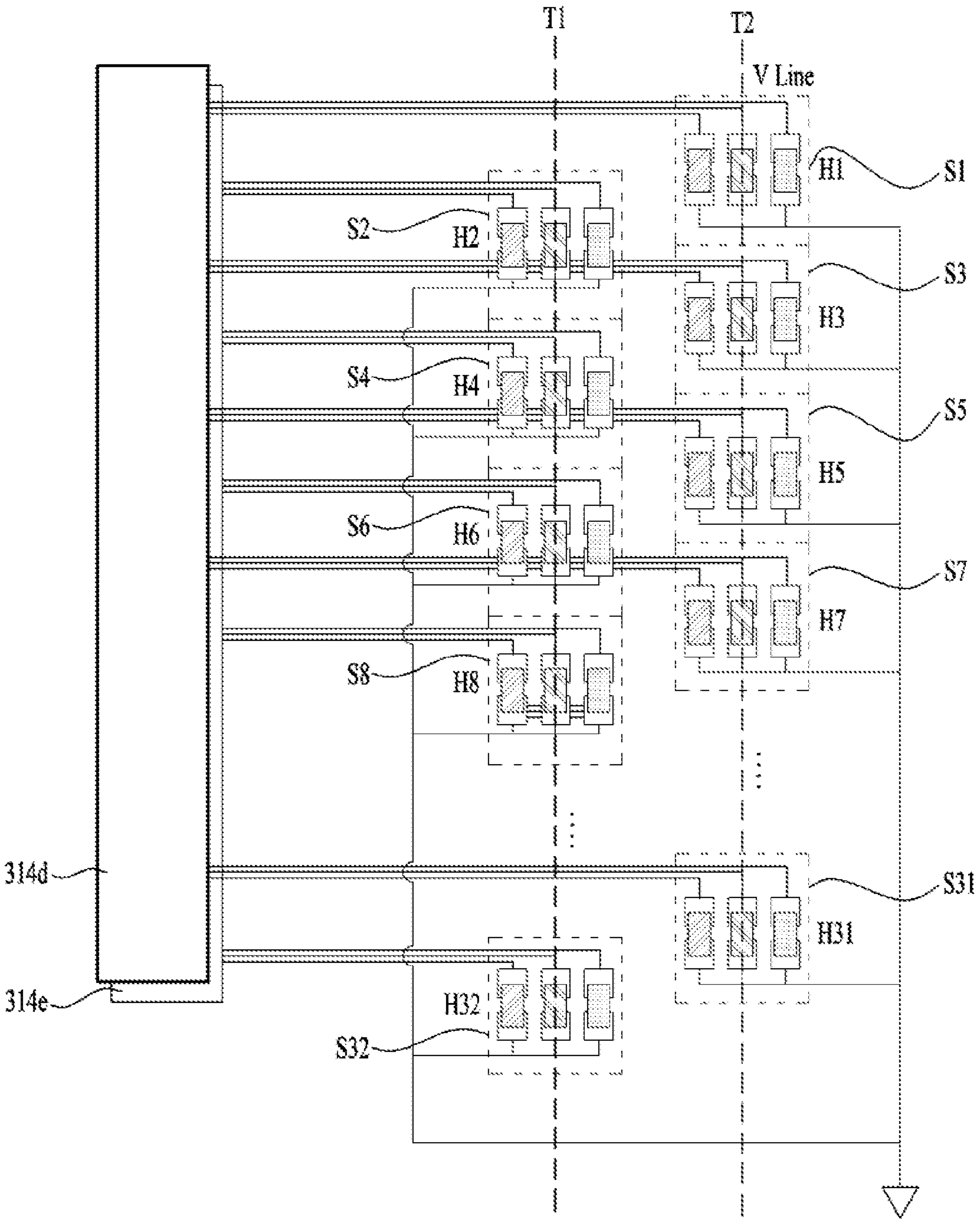
FIG. 20 is a schematic diagram showing the arrangement of pixels according to still another embodiment of the present disclosure.

FIG. 20 is a schematic diagram showing the arrangement of pixels according to still another embodiment of the present disclosure. That is, FIG. 20 illustrates still another example of arrangement of pixels according to the arrangement of the subpixels corresponding to FIG. 16(*d*). Referring to FIG. 20, in the state in which a first light-emitting element array, which is disposed in the longitudinal direction of the panel, is located along a line T2, there may be further provided a second light-emitting element array, which is spaced a predetermined distance apart from the first light-emitting element array along in a direction parallel to the longitudinal direction and in which individual pixels are disposed in the longitudinal direction (along a line T1).

That is, the first light-emitting element array described above may correspond to the pixels S1, S3, S5, . . . , and, S31 located in the line T2, and the second light-emitting element array may correspond to the pixels, S2, S4, S6, . . . , and S32 located in the line T1.

In this case, as illustrated, each of the individual pixels S2, S4, S6, . . . , and S32 of the second light-emitting element array may be located between two adjacent ones of the individual pixels S1, S3, S5, . . . , and S31 of the first light-emitting element array in the longitudinal direction of the panel.

In general, due to connection wiring for a light source (LED) constituting each subpixel, an interval of a certain distance or greater is inevitably formed between two adjacent pixels in one light-emitting element array, for example, between the first pixel S1 and the second pixel S3 in the first light-emitting element array. That is, there may be a limitation in minimizing the interval between two adjacent pixels.

However, as described above, since the spatial constraint of the subpixels is eliminated by individually (sequentially) driving the subpixels, additional pixels may be disposed between the individual pixels.

That is, since the first pixel S1 and the second pixel S3 are spaced a predetermined distance apart from each other, the pixel S2 may be additionally disposed at a position without a spatial constraint therebetween. Accordingly, the precision of the pixels may be improved, and thus the resolution of the display may be improved.

In this case, each of drivers 314*d* and 314*d* may drive subpixels having a corresponding color at an individual timing in a unit number of pixels. For example, the fourth driver 314*d* may drive subpixels of the first light-emitting element array at the first timing T2 in the unit number of pixels. In addition, the fifth driver 314*e* may drive subpixels of the second light-emitting element array at the second timing T1 in the unit number of pixels.

That is, the fourth driver 314*d* may simultaneously (or sequentially) drive the subpixels of the first light-emitting element array, and the fifth driver 314*e* may simultaneously (or sequentially) drive the subpixels of the second light-emitting element array.

In FIG. 20, the unit number may be 32. That is, when drivers having given specifications are used, resolution and precision may be doubled.

Figure 21:
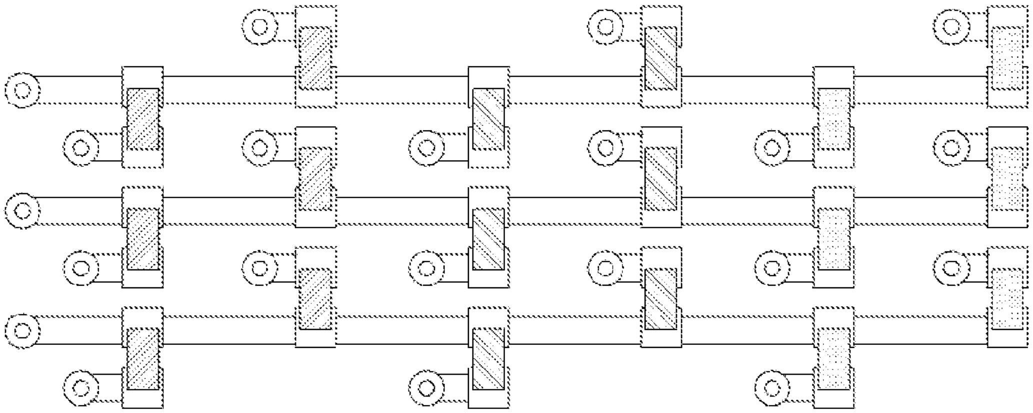
FIG. 21 is a schematic diagram showing an example of arrangement of subpixels for improving resolution (precision) in the rotatable display device of the present disclosure.

FIG. 21 is a schematic diagram showing an example of arrangement of subpixels for improving resolution (precision) in the rotatable display device of the present disclosure.

FIGS. 19 and 20 illustrate examples in which individual pixel areas are spaced a predetermined distance apart from each other, whereas FIG. 21 illustrates an example in which subpixels are spaced a predetermined distance apart from each other.

That is, since first blue pixels, which are disposed in the longitudinal direction, are spaced a predetermined distance apart from each other, a second blue pixel may be located between the first blue pixels. Thereafter, since first green pixels, which are disposed in the longitudinal direction, are spaced a predetermined distance apart from each other, a second green pixel may be located between the first green pixels. Thereafter, since first red pixels, which are disposed in the longitudinal direction, are spaced a predetermined distance apart from each other, a second red pixel may be located between the first red pixels.

As described above, in the rotatable afterimage display device, spatial constraint is eliminated by sequentially driving the subpixels, and accordingly, the subpixels may be more densely arranged in various forms, thereby improving precision and resolution.

The above description is merely illustrative of the technical idea of the present disclosure. Those of ordinary skill in the art to which the present disclosure pertains will be able to make various modifications and variations without departing from the essential characteristics of the present disclosure.

Therefore, embodiments disclosed in the present disclosure are not intended to limit the technical idea of the present disclosure, but to describe the same, and the scope of the technical idea of the present disclosure is not limited by such embodiments.

The scope of protection of the present disclosure should be interpreted by the claims below, and all technical ideas within the scope equivalent thereto should be construed as being included in the scope of the present disclosure.

INDUSTRIAL APPLICABILITY

The present disclosure may provide a rotatable display device using a light-emitting diode (LED), which is a semiconductor light-emitting element.

What is claimed is:

1. A rotatable display device using a light-emitting element, the rotatable display device comprising:

a fixed portion comprising a motor;

a rotary portion located on the fixed portion and configured to be rotated by the motor; and a light source comprising:

one or more first panels coupled to the rotary portion and disposed to extend radially; or one or more second panels disposed along a cylindrical surface, wherein the light source further comprises first light-emitting element arrays comprising individual pixels disposed on the one or more first panels or the one or more second panels along a longitudinal direction, wherein each of the individual pixels of the first light-emitting element arrays comprises subpixels disposed along a direction perpendicular to the longitudinal direction, and wherein the subpixels are controllable to sequentially emit light.

2. The rotatable display device of claim 1, further comprising second light-emitting element arrays disposed along a direction parallel to the longitudinal direction, the second light-emitting element arrays comprising individual pixels disposed along the longitudinal direction.

3. The rotatable display device of claim 2, wherein each of the individual pixels of the second light-emitting element arrays is located between corresponding pixels of the individual pixels of the first light-emitting element arrays with respect to the longitudinal direction.

4. The rotatable display device of claim 2, wherein the first light-emitting element arrays and the second light-emitting element arrays are controllable to sequentially emit light.

5. The rotatable display device of claim 1, wherein the fixed portion and the rotary portion are electrically coupled to each other through a wireless power transfer device.

6. The rotatable display device of claim 5, wherein the wireless power transfer device comprises:

a wireless power transmitter provided at the fixed portion;

a transmission coil coupled to the wireless power transmitter;

a reception coil facing the transmission coil; and a wireless power receiver coupled to the reception coil.

7. The rotatable display device of claim 1, wherein the light source comprises drivers configured to drive the first light-emitting element arrays.

8. The rotatable display device of claim 7, wherein the drivers are provided on surfaces of the one or more first panels or surfaces of the one or more second panels to face an opposite direction with respect to the first light-emitting element arrays.

9. The rotatable display device of claim 7, further comprising an image processor configured to transmit control signals to the drivers.

10. The rotatable display device of claim 9, wherein the image processor is further configured to transmit signals controlling the first light-emitting element arrays to display image data of a specific frame.

11. The rotatable display device of claim 10, wherein the image processor is further configured to transmit signals controlling the first light-emitting element arrays to be sequentially driven.

12. A rotatable display device using a light-emitting element, the rotatable display device comprising:

a fixed portion comprising a motor;

a rotary portion located on the fixed portion and configured to be rotated by the motor; and a light source comprising:

one or more first panels coupled to the rotary portion and disposed to extend radially; or one or more second panels disposed along a cylindrical surface, wherein the light source further comprises:

first light-emitting element arrays comprising individual pixels disposed on the one or more first panels or the one or more second panels along a longitudinal direction; and second light-emitting element arrays spaced a predetermined distance apart from the first light-emitting element arrays with respect to a direction parallel to the longitudinal direction, the second light-emitting element arrays comprising individual pixels disposed along the longitudinal direction, wherein each of the individual pixels of the second light-emitting element arrays is located between corresponding pixels of the individual pixels of the first light-emitting element arrays with respect to the longitudinal direction.

13. The rotatable display device of claim 12, wherein each of the individual pixels of the first light-emitting element arrays and each of the individual pixels of the second light-emitting element arrays comprises subpixels disposed along a direction perpendicular to the longitudinal direction.

14. The rotatable display device of claim 12, wherein the first light-emitting element arrays and the second light-emitting element arrays are controllable to sequentially emit light.

15. The rotatable display device of claim 12, wherein the fixed portion and the rotary portion are electrically coupled to each other through wireless power transfer.

16. The rotatable display device of claim 12, wherein the light source further comprises:

drivers configured to drive the first light-emitting element arrays and the second light-emitting element arrays, and wherein the rotatable display device further comprises an image processor configured to transmit control signals to the drivers.

17. The rotatable display device of claim 16, wherein the image processor is further configured to transmit signals controlling the first light-emitting element arrays and the second light-emitting element arrays to display image data of a specific frame.

18. The rotatable display device of claim 16, wherein the image processor is further configured to transmit signals controlling the first light-emitting element arrays and the second light-emitting element arrays to be sequentially driven.

19. A rotatable display device using a light-emitting element, the rotatable display device comprising:

a fixed portion comprising a motor;

a rotary portion located on the fixed portion and configured to be rotated by the motor; and a light source comprising:

one or more first panels coupled to the rotary portion and disposed to extend radially; or one or more second panels disposed along a cylindrical surface, wherein the light source further comprises:

first light-emitting element arrays comprising individual pixels disposed on the one or more first panels or the one or more second panels along a longitudinal direction; and second light-emitting element arrays spaced a predetermined distance apart from the first light-emitting element arrays with respect to a direction parallel to the longitudinal direction, the second light-emitting element arrays comprising individual pixels disposed along the longitudinal direction, wherein each of the individual pixels of the first light-emitting element arrays comprises subpixels along a direction perpendicular to the longitudinal direction which are controllable to sequentially emit light.

* * * * *